United States Patent
Zhao et al.

(10) Patent No.: US 12,124,439 B2
(45) Date of Patent: Oct. 22, 2024

(54) DIGITAL CONTENT QUERY-AWARE SEQUENTIAL SEARCH

(71) Applicant: Adobe Inc., San Jose, CA (US)

(72) Inventors: Handong Zhao, Cupertino, CA (US);
Zhe Lin, Clyde Hill, WA (US);
Zhaowen Wang, San Jose, CA (US);
Zhankui He, San Diego, CA (US);
Ajinkya Gorakhnath Kale, San Jose, CA (US)

(73) Assignee: Adobe Inc., San Jose, CA (US)

( * ) Notice: Subject to any disclaimer, the term of this patent is extended or adjusted under 35 U.S.C. 154(b) by 62 days.

(21) Appl. No.: 17/513,127

(22) Filed: Oct. 28, 2021

(65) Prior Publication Data
US 2023/0133522 A1    May 4, 2023

(51) Int. Cl.
*G06F 16/245*   (2019.01)
*G06F 16/248*   (2019.01)
*G06N 20/00*    (2019.01)

(52) U.S. Cl.
CPC .......... *G06F 16/245* (2019.01); *G06F 16/248* (2019.01); *G06N 20/00* (2019.01)

(58) Field of Classification Search
None
See application file for complete search history.

(56) References Cited

U.S. PATENT DOCUMENTS

| | | | |
|---|---|---|---|
| 12,019,671 B2 | 6/2024 | Zhao et al. | |
| 2018/0181592 A1* | 6/2018 | Chen | G06N 3/08 707/999.003 |
| 2018/0352091 A1* | 12/2018 | Puri | H04M 7/0036 707/769 |
| 2020/0356598 A1* | 11/2020 | Cao | G06N 20/00 707/769 |
| 2020/0357143 A1* | 11/2020 | Chiu | G06F 18/253 707/999.003 |
| 2021/0005195 A1* | 1/2021 | Tao | G06N 3/044 707/769 |

(Continued)

FOREIGN PATENT DOCUMENTS

WO   WO-2020041413 A1 *  2/2020  ....... G06F 16/90324

OTHER PUBLICATIONS

Shmiel, Tomer (Year: 2019).*

(Continued)

*Primary Examiner* — Yuk Ting Choi
(74) *Attorney, Agent, or Firm* — FIG. 1 Patents

(57) ABSTRACT

Digital content search techniques are described that overcome the challenges found in conventional sequence-based techniques through use of a query-aware sequential search. In one example, a search query is received and sequence input data is obtained based on the search query. The sequence input data describes a sequence of digital content and respective search queries. Embedding data is generated based on the sequence input data using an embedding module of a machine-learning model. The embedding module includes a query-aware embedding layer that generates embeddings of the sequence of digital content and respective search queries. A search result is generated referencing at least one item of digital content by processing the embedding data using at least one layer of the machine-learning model.

20 Claims, 12 Drawing Sheets

(56) References Cited

U.S. PATENT DOCUMENTS

| | | | |
|---|---|---|---|
| 2022/0172040 A1* | 6/2022 | Kazi | G06N 3/08 707/769 |
| 2022/0198211 A1 | 6/2022 | Ferreira et al. | |
| 2022/0230061 A1 | 7/2022 | Singh et al. | |
| 2023/0116969 A1 | 4/2023 | Zhao et al. | |
| 2023/0133522 A1* | 5/2023 | Zhao | G06N 20/00 707/769 |

OTHER PUBLICATIONS

U.S. Appl. No. 17/501,191, "Non-Final Office Action", U.S. Appl. No. 17/501,191, Mar. 15, 2023, 20 pages.

"CIKM Cup 2016 Track 2: Personalized E-Commerce Search Challenge", DIGINETICA, CodaLab [online][retrieved Oct. 18, 2021]. Retrieved from the Internet <https://competitions.codalab.org/competitions/11161>., Aug. 5, 2016, 3 pages.

"Unsplash Dataset", Unsplash [online][retrieved Oct. 18, 2021]. Retrieved from the Internet <https://unsplash.com/data>., Aug. 2020, 4 pages.

Bhattacharya, Moumita et al., "Query as Context for Item-to-Item Recommendation", RecSys '20: Fourteenth ACM Conference on Recommender Systems [retrieved Dec. 10, 2021]. Retrieved from the Internet <https://doi.org/10.1145/3383313.3411480>., Sep. 22, 2020, 2 pages.

Bogina, Veronika et al., "Incorporating Dwell Time in Session-Based Recommendations with Recurrent Neural Networks", RecSys '17: Proceedings of the Eleventh ACM Conference on Recommender Systems [retrieved Sep. 16, 2021]. Retrieved from the Internet <http://ceur-ws.org/Vol-1922/paper11.pdf>., Aug. 2017, 3 Pages.

Chang, Yi et al., "Query Understanding for Search Engines", Springer International Publishing, New York City, ISBN 978-3-030-58334-7 [retrieved Dec. 10, 2021]. Retrieved from the Internet <https://doi.org/10.1007/978-3-030-58334-7>., Reference needs broken into parts, Dec. 2020, 228 pages.

Chen, Xusong et al., "BERT4SessRec: Content-Based Video Relevance Prediction with Bidirectional Encoder Representations from Transformer", MM '19: Proceedings of the 27th ACM International Conference on Multimedia [Sep. 17, 2021]. Retrieved from the Internet <https://doi.org/10.1145/3343031.3356051>., Oct. 2019, 5 pages.

Cho, Kyunghyun et al., "Learning Phrase Representations using RNN Encoder-Decoder for Statistical Machine Translation", Cornell University, arXiv Preprint, arXiv.org [retrieved Jan. 13, 2022]. Retrieved from the Internet <https://arxiv.org/pdf/1406.1078.pdf>., Jun. 3, 2014, 15 pages.

Cho, Kyunghyun et al., "On the Properties of Neural Machine Translation: Encoder-Decoder Approaches", Eighth Workshop on Syntax, Semantics and Structure in Statistical Translation (SSST-8) [retrieved Sep. 17, 2021]. Retrieved from the Internet <https://arxiv.org/pdf/1409.1259.pdf>., 2014, 9 Pages.

Dallmann, Alexander et al., "Improving Session Recommendation with Recurrent Neural Networks by Exploiting Dwell Time", Cornell University, arXiv Preprint, arXiv.org [retrieved Sep. 16, 2021]. Retrieved from the Internet <https://arxiv.org/pdf/1706.10231.pdf>., Jun. 2017, 6 Pages.

Dehghani, Mostafa et al., "Neural Ranking Models with Weak Supervision", SIGIR '17: Proceedings of the 40th International ACM SIGIR Conference on Research and Development in Information Retrieval [retrieved Sep. 16, 2021]. Retrieved from the Internet <https://doi.org/10.1145/3077136.3080832>., Aug. 7, 2017, 10 Pages.

Devlin, Jacob et al., "BERT: Pre-Training of Deep Bidirectional Transformers for Language Understanding", Cornell University, arXiv Preprint, arXiv.org [retrieved on Sep. 16, 2021]. Retrieved from the Internet <https://arxiv.org/pdf/1810.04805.pdf>., May 24, 2019, 16 pages.

Devooght, Robin et al., "Long and Short-Term Recommendations with Recurrent Neural Networks", UMAP '17: Proceedings of the 25th Conference on User Modeling, Adaptation and Personalization [retrieved Sep.17, 2021]. Retrieved from the Internet <https://doi.org/10.1145/3079628.3079670>., Jul. 9, 2017, 9 Pages.

Donkers, Tim et al., "Sequential User-based Recurrent Neural Network Recommendations", RecSys '17: Proceedings of the Eleventh ACM Conference on Recommender Systems [retrieved Sep. 16, 2021]. Retrieved from the Internet <https://cseweb.ucsd.edu/classes/fa17/cse291-b/reading/p152-donkers.pdf>., Aug. 27, 2017, 9 Pages.

Guo, Maosheng et al., "Gaussian Transformer: A Lightweight Approach for Natural Language Inference", Proceedings of the AAAI Conference on Artificial Intelligence, vol. 33, No. 01 [retrieved Sep. 17, 2021]. Retrieved from the Internet <http://ir.hit.edu.cn/~msguo/AAAI-GuoM.1484.pdf>., Jul. 17, 2019, 8 Pages.

Guo, Qipeng et al., "Multi-Scale Self-Attention for Text Classification", Proceedings of the AAAI Conference on Artificial Intelligence, vol. 34 No. 05 [retrieved Sep. 17, 2021]. Retrieved from the Internet <https://arxiv.org/pdf/1912.00544.pdf>., Apr. 3, 2020, 8 Pages.

Harper, F M. et al., "The MovieLens Datasets: History and Context", ACM Transactions on Interactive Intelligent Systems (TiiS) 5, 4, Article 19 [retrieved Sep. 20, 2021]. Retrieved from the Internet <http://files.grouplens.org/papers/harper-tiis2015.pdf>., Dec. 2015, 20 pages.

Hashemi, Homa B. et al., "Query Intent Detection using Convolutional Neural Networks", 2016 International Conference on Web Search and Data Mining, Workshop on Query Understanding [retrieved Sep. 16, 2021]. Retrieved from the Internet <http://people.cs.pitt.edu/~hashemi/papers/QRUMS2016_HBHashemi.pdf>., Feb. 2016, 5 pages.

He, Kaiming et al., "Deep Residual Learning for Image Recognition", Proceedings of the IEEE conference on computer vision and pattern recognition, 2016 [retrieved Sep. 20, 2021], Retrieved from the Internet: <https://openaccess.thecvf.com/content_cvpr_2016/papers/He_Deep_Residual_Learning_CVPR_2016_paper.pdf>., Jun. 2016, 9 pages.

He, Ruining et al., "Fusing Similarity Models with Markov Chains for Sparse Sequential Recommendation", Cornell University, arXiv Preprint, arXiv.org [retrieved Sep. 16, 2021]. Retrieved from the Internet <https://arxiv.org/pdf/1609.09152.pdf>., Sep. 28, 2016, 10 pages.

He, Ruining et al., "VBPR: Visual Bayesian Personalized Ranking from Implicit Feedback", Cornell University, arXiv Preprint, arXiv.org [retrieved Sep. 16, 2021]. Retrieved from the Internet <https://arxiv.org/pdf/1510.01784.pdf>., Oct. 2015, 7 pages.

He, Xiangnan et al., "Neural Factorization Machines for Sparse Predictive Analytics", SIGIR '17: Proceedings of the 40th International ACM SIGIR Conference on Research and Development in Information Retrieval [retrieved Sep. 16, 2021]. Retrieved from the Internet <http://staff.ustc.edu.cn/~hexn/papers/sigir17-nfm.pdf>., Aug. 7, 2017, 10 pages.

Hidasi, Balazs et al., "Parallel Recurrent Neural Network Architectures for Feature-rich Session-based Recommendations", RecSys '16: Proceedings of the 10th ACM Conference on Recommender Systems [retrieved Apr. 19, 2021]. Retrieved from the Internet <http://www.hidasi.eu/content/p_rnn_recsys16.pdf>., Sep. 2016, 8 pages.

Hidasi, Balazs et al., "Session-based Recommendations with Recurrent Neural Networks", Cornell University, arXiv Preprint, arXiv.org [retrieved Sep. 16, 2021]. Retrieved from the Internet <https://arxiv.org/pdf/1511.06939.pdf>., Mar. 29, 2016, 10 pages.

Hidasi, Balázs et al., "Recurrent Neural Networks with Top-k Gains for Session-based Recommendations", CIKM '18: Proceedings of the 27th ACM International Conference on Information and Knowledge Management [retrieved Sep. 16, 2021]. Retrieved from the Internet <https://arxiv.org/pdf/1706.03847.pdf>., Aug. 28, 2018, 10 pages.

Hochreiter, Sepp et al., "Long Short-Term Memory", Neural Computation, vol. 9, No. 8 [retrieved Sep. 3, 2021]. Retrieved from the Internet <http://www.cs.cmu.edu/afs/cs/user/bhiksha/WWW/courses/deeplearning/Fall.2016/pdfs/Hochreiter97_lstm.pdf>., Nov. 15, 1997, 32 pages.

(56) References Cited

OTHER PUBLICATIONS

Huang, Jin et al., "Improving Sequential Recommendation with Knowledge-Enhanced Memory Networks", SIGIR '18: The 41st International ACM SIGIR Conference on Research & Development in Information Retrieval [retrieved Sep. 16, 2021]. Retrieved from the Internet <https://tongtianta.site/oss//paper_pdf/0224d4ea-ad22-11e9-a230-00163e08bb86.pdf>., Jun. 27, 2018, 10 Pages.

Huang, Xiaowen et al., "CSAN: Contextual Self-Attention Network for User Sequential Recommendation", MM '18: Proceedings of the 26th ACM international conference on Multimedia [retrieved Sep. 20, 2021]. Retrieved from the Internet <https://dl.acm.org/doi/pdf/10.1145/3240508.3240609>., Oct. 2018, 9 pages.

Kabbur, Santosh et al., "FISM: factored item similarity models for top-N recommender systems", KDD '13: Proceedings of the 19th ACM SIGKDD international conference on Knowledge discovery and data mining [retrieved Sep. 20, 2021]. Retrieved from the Internet <https://citeseerx.ist.psu.edu/viewdoc/download?doi=10.1.1.714.8026&rep=rep1&type=pdf>., Aug. 11, 2013, 9 Pages.

Kang, Wang-Cheng et al., "Self-Attentive Sequential Recommendation", 2018 IEEE International Conference on Data Mining (ICDM) [retrieved Sep. 16, 2021]. Retrieved from the Internet <http://cseweb.ucsd.edu/~jmcauley/pdfs/icdm18.pdf>., Nov. 2018, 10 pages.

Kingma, Diederik P. et al., "Adam: A Method for Stochastic Optimization", Cornell University, arXiv Preprint, arXiv.org [retrieved Sep. 16, 2021]. Retrieved from the Internet <https://arxiv.org/pdf/1412.6980.pdf>., Jan. 30, 2017, 15 pages.

Krichene, Walid et al., "On Sampled Metrics for Item Recommendation", KDD '20: Proceedings of the 26th ACM SIGKDD International Conference on Knowledge Discovery & Data Mining [retrieved Sep. 16, 2021]. Retrieved from the Internet <https://doi.org/10.1145/3394486.3403226>., Aug. 2020, 10 pages.

Lei Ba, Jimmy et al., "Layer Normalization", Cornell University arXiv Preprint, arXiv.org [retrieved Mar. 12, 2021]. Retrieved from the Internet <https://arxiv.org/pdf/1607.06450.pdf>., Jul. 21, 2016, 14 pages.

Li, Jiacheng et al., "Time Interval Aware Self-Attention for Sequential Recommendation", WSDM '20: Proceedings of the 13th International Conference on Web Search and Data Mining [retrieved Sep. 16, 2021]. Retrieved from the Internet <https://doi.org/10.1145/3336191.3371786>., Jan. 20, 2020, 9 Pages.

Li, Jian et al., "Multi-Head Attention with Disagreement Regularization", Cornell University arXiv Preprint, arXiv.org [retrieved Sep. 20, 2021]. Retrieved from the Internet <https://arxiv.org/pdf/1810.10183.pdf>., Oct. 2018, 6 Pages.

Li, Jing et al., "Neural Attentive Session-based Recommendation", CIKM '17: Proceedings of the 2017 ACM on Conference on Information and Knowledge Management [retrieved Sep. 20, 2021]. Retrieved from the Internet <https://arxiv.org/pdf/1711.04725.pdf>., Nov. 6, 2017, 10 Pages.

Li, Shihao et al., "MRIF: Multi-resolution Interest Fusion for Recommendation", SIGIR '20: Proceedings of the 43rd International ACM SIGIR Conference on Research and Development in Information Retrieval [retrieved Sep. 20, 2021]. Retrieved from the Internet <https://arxiv.org/pdf/2007.07084.pdf>., Jul. 25, 2020, 4 Pages.

Lin, Jing et al., "FISSA: Fusing Item Similarity Models with Self-Attention Networks for Sequential Recommendation", RecSys '20: Fourteenth ACM Conference on Recommender Systems [retrieved Sep. 16, 2021]. Retrieved from the Internet <http://csse.szu.edu.cn/staff/panwk/publications/Conference-RecSys-20-FISSA.pdf>., Sep. 22, 2020, 10 Pages.

Liu, Chang et al., "Non-invasive Self-attention for Side Information Fusion in Sequential Recommendation", Cornell University, arXiv Preprint, arXiv.org [retrieved Sep. 16, 2021]. Retrieved from the Internet <https://arxiv.org/pdf/2103.03578.pdf>., Mar. 2021, 8 Pages.

Liu, Qiang et al., "Context-Aware Sequential Recommendation", IEEE International Conference on Data Mining (ICDM) [retrieved Sep. 16, 2021]. Retrieved from the Internet <https://arxiv.org/pdf/1609.05787.pdf>., Dec. 2016, 6 Pages.

Ma, Chen et al., "Hierarchical Gating Networks for Sequential Recommendation", KDD '19: Proceedings of the 25th ACM SIGKDD International Conference on Knowledge Discovery & Data Mining [retrieved Sep. 17, 2021]. Retrieved from the Internet <https://arxiv.org/pdf/1906.09217v1.pdf>., Jul. 25, 2019, 9 Pages.

McAuley, Julian et al., "Image-based Recommendations on Styles and Substitutes", SIGIR '15: Proceedings of the 38th International ACM SIGIR Conference on Research and Development in Information Retrieval [retrieved Sep. 20, 2021]. Retrieved from the Internet, <http://citeseerx.ist.psu.edu/viewdoc/download?doi=10.1.1.700.743&rep=rep1&type=pdf>., Aug. 2015, 10 pages.

Meng, Wenjing et al., "Incorporating User Micro-behaviors and Item Knowledge into Multi-task Learning for Session-based Recommendation", SIGIR '20: Proceedings of the 43rd International ACM SIGIR Conference on Research and Development in Information Retrieval [retrieved Sep. 16, 2021]. Retrieved from the Internet <https://arxiv.org/pdf/2006.06922.pdf>., Jun. 12, 2020, 10 Pages.

Mikolov, Tomas et al., "Distributed Representations of Words and Phrases and their Compositionality", NIPS'13: Proceedings of the 26th International Conference on Neural Information Processing Systems vol. 2 [retrieved Sep. 17, 2021]. Retrieved from the Internet <https://proceedings.neurips.cc/paper/2013/file/9aa42b31882ec039965f3c4923ce901b-Paper.pdf>., Oct. 2013, 9 pages.

Nalisnick, Eric et al., "Improving Document Ranking with Dual Word Embeddings", Proceedings of the 25th International Conference Companion on World Wide Web [retrieved Sep. 17, 2021]. Retrieved from the Internet <http://cs.unibo.it/~montesi/CBD/Articoli/2016_Improving%20Document%20Ranking%20with%20Dual%20Word%20Embeddings.pdf>., Apr. 11, 2016, 2 Pages.

Ni, Jianmo et al., "Justifying Recommendations using Distantly-Labeled Reviews and Fine-Grained Aspects", Proceedings of the 2019 Conference on EMNLP-IJCNLP [retrieved Sep. 17, 2021]. Retrieved from the Internet <https://aclanthology.org/D19-1018.pdf>., Nov. 2019, 10 Pages.

Park, Dae Hoon et al., "A Neural Language Model for Query Auto-Completion", International ACM SIGIR Conference on Research and Development in Information Retrieval [retrieved Sep. 17, 2021]. Retrieved from the Internet <https://www.researchgate.net/publication/317379370_A_Neural_Language_Model_for_Query_Auto-Completion>., Aug. 7, 2017, 5 Pages.

Pennington, Jeffrey et al., "GloVe: Global Vectors for Word Representation", Proceedings of the 2014 Conference on Empirical Methods in Natural Language Processing (EMNLP) [retrieved on Sep. 17, 2021], Retrieved from the Internet: <https://www.aclweb.org/anthology/D14-1162.pdf>., Sep. 2014, 12 pages.

Rendle, Steffen et al., "BPR: Bayesian Personalized Ranking from Implicit Feedback", Cornell University arXiv Preprint, arXiv.org [retrieved Sep. 17, 2021]. Retrieved from the Internet <https://arxiv.org/ftp/arxiv/papers/1205/1205.2618.pdf>., May 9, 2012, 10 pages.

Rendle, Steffen , "Factorization Machines", 2010 IEEE International Conference on Data Mining [retrieved Sep. 17, 2021]. Retrieved from the Internet <https://www.csie.ntu.edu.tw/~b97053/paper/Rendle2010FM.pdf>., Dec. 2010, 6 pages.

Rendle, Steffen et al., "Factorizing Personalized Markov Chains for Next-Basket Recommendation", WWW'10: Proceedings of the 19th international conference on World wide web [retrieved Sep. 17, 2021]. Retrieved from the Internet <http://www.ra.ethz.ch/cdstore/www2010/www/p811.pdf>., Apr. 2010, 10 pages.

Shi, Yangyang et al., "Deep LSTM based Feature Mapping for Query Classification", Proceedings of the 2016 Conference of the North American Chapter of the Association for Computational Linguistics: Human Language Technologies [retrieved Sep. 17, 2021]. Retrieved from the Internet <https://aclanthology.org/N16-1176.pdf>., Jun. 2016, 11 Pages.

Shi, Yue et al., "CARS2: Learning Context-aware Representations for Context-aware Recommendations", CIKM '14: Proceedings of the 23rd ACM International Conference on Conference on Information and Knowledge Management [retrieved Sep. 17, 2021]. Retrieved from the Internet <https://alexiskz.files.wordpress.com/2016/06/km1212-karatzoglou.pdf>., Nov. 3, 2014, 10 Pages.

Shi, Yue et al., "TFMAP: optimizing MAP for top-n context-aware recommendation", SIGIR '12: Proceedings of the 35th international

(56) References Cited

OTHER PUBLICATIONS

Acm Sigir conference on Research and development in information retrieval [retrieved Sep. 17, 2021]. Retrieved from the Internet <http://www.cse.cuhk.edu.hk/irwin.king/_media/presentations/tfmap-shi.pdf>., Aug. 12, 2012, 10 Pages.

Song, Younghun et al., "Augmenting Recurrent Neural Networks with High-Order User-Contextual Preference for Session-Based Recommendation", Cornell University arXiv Preprint, arXiv.org [retrieved Sep. 17, 2021]. Retrieved from the Internet <https://arxiv.org/pdf/1805.02983.pdf>., May 2018, 5 Pages.

Sun, Fei et al., "BERT4Rec: Sequential Recommendation with Bidirectional Encoder Representations from Transformer", Cornell University, arXiv Preprint, arXiv.org [retrieved Sep. 16, 2021]. Retrieved from the Internet <https://arxiv.org/pdf/1904.06690.pdf>., Aug. 21, 2019, 11 pages.

Tang, Jiaxi et al., "Personalized Top-N Sequential Recommendation via Convolutional Sequence Embedding", WSDM '18: Proceedings of the Eleventh ACM International Conference on Web Search and Data Mining [retrieved Sep. 16, 2021]. Retrieved from the Internet <https://doi.org/10.1145/3159652.3159656>., Feb. 2018, 9 pages.

Vaswani, Ashish et al., "Attention Is All You Need", Cornell University arXiv Preprint, arXiv.org [retrieved Sep. 17, 2021]. Retrieved from the Internet <https://arxiv.org/pdf/1706.03762.pdf>., Dec. 6, 2017, 15 pages.

Wu, Liwei et al., "SSE-PT: Sequential Recommendation Via Personalized Transformer", RecSys '20: Fourteenth ACM Conference on Recommender Systems [retrieved Sep. 17, 2021]. Retrieved from the Internet <https://dl.acm.org/doi/pdf/10.1145/3383313.3412258>., Sep. 2020, 10 pages.

Wu, Liwei et al., "Stochastic Shared Embeddings: Data-driven Regularization of Embedding Layers", Cornell University arXiv Preprint, arXiv.org [retrieved Sep. 17, 2021]. Retrieved from the Internet <https://arxiv.org/pdf/1905.10630.pdf>., May 25, 2019, 15 pages.

Xiong, Chenyan et al., "End-to-End Neural Ad-hoc Ranking with Kernel Pooling", SIGIR '17: Proceedings of the 40th International ACM SIGIR Conference on Research and Development in Information Retrieval [retrieved Sep. 17, 2021]. Retrieved from the Internet <http://www.cs.cmu.edu/~callan/Projects/P2P/Papers/sigir17-Chenyan-Xiong-a.pdf>., Aug. 7, 2017, 10 Pages.

Yang, Baosong et al., "Modeling Localness for Self-Attention Networks", Cornell University arXiv Preprint, arXiv.org [retrieved Sep. 20, 2021]. Retrieved from the Internet <https://arxiv.org/pdf/1810.10182.pdf>., Oct. 2018, 10 Pages.

Yuan, Fajie et al., "A Simple Convolutional Generative Network for Next Item Recommendation", WSDM '19: Proceedings of the Twelfth ACM International Conference on Web Search and Data Mining [retrieved Sep. 20, 2021]. Retrieved from the Internet <https://core.ac.uk/download/pdf/337605672.pdf>., Jan. 30, 2019, 10 Pages.

Yun, Chulhee et al., "Are Transformers universal approximators of sequence-to-sequence functions?", Cornell University arXiv Preprint, arXiv.org [retrieved Sep. 20, 2021]. Retrieved from the Internet <https://arxiv.org/pdf/1912.10077.pdf>., Dec. 2019, 23 Pages.

Zamani, Hamed et al., "Relevance-based Word Embedding", SIGIR '17: Proceedings of the 40th International ACM SIGIR Conference on Research and Development in Information Retrieval [retrieved Sep. 17, 2021]. Retrieved from the Internet <https://arxiv.org/pdf/1705.03556.pdf>., Aug. 7, 2017, 10 Pages.

Zhang, Tingting et al., "Feature-level Deeper Self-Attention Network for Sequential Recommendation", Proceedings of the Twenty-Eighth International Joint Conference on Artificial Intelligence (IJCAI-19) [retrieved Apr. 27, 2021]. Retrieved from the Internet <https://www.ijcai.org/Proceedings/2019/0600.pdf>., Aug. 2019, 7 pages.

U.S. Appl. No. 17/501,191 , "Final Office Action", U.S. Appl. No. 17/501,191, Aug. 4, 2023, 24 pages.

U.S. Appl. No. 17/501,191 , "Non-Final Office Action", U.S. Appl. No. 17/501,191, Nov. 20, 2023, 25 pages.

U.S. Appl. No. 17/501,191 , "Notice of Allowance", U.S. Appl. No. 17/501,191, filed Mar. 19, 2024, 9 pages.

\* cited by examiner

DIGITAL CONTENT QUERY-AWARE SEQUENTIAL SEARCH

BACKGROUND

Search is one of the primary mechanisms supported by computing devices to locate digital content such as digital images, digital movies, digital books, digital documents, applications, settings, and so forth. The general goal of a search is to identify an underlying intent of a search query and locate digital content corresponding to that intent. Intent is typically expressed in a search query using text. However, use of text is challenging especially for non-textual digital content, such as digital images. In these situations, conventional text-based techniques are tasked with matching an intent of an originator of a search query expressed via text with text used to tag the digital content, which is prone to error.

One technique that has been developed to aid in identifying intent of an entity regarding a search query involves leveraging sequences of interaction with past digital content to identify likely underlying intent for a search. However, conventional techniques to leverage sequences are challenged due to data sparsity issues as well as noisy and complex relationships between items in a sequence. As a result, conventional techniques often fail for their intended purpose when employed as part of a search technique. This results in inefficient use of computation resources used to support digital content searches due to repeated searches used to obtain a desired result.

SUMMARY

Digital content search techniques are described that overcome the challenges found in conventional sequence-based techniques through use of a query-aware sequential search. In one example, digital content search techniques are described that overcome the technical challenges found in conventional sequence-based techniques. This is achieved by leveraging search queries used to obtain digital content that is a subject of past interaction as a contextual signal to improve accuracy and clarity of an underlying search intent. These techniques support a general framework to incorporate query information into sequences, improve generalization of a machine-learning model by leveraging search query to digital content linkage information, and expand an ability to generate training data to improve model-training accuracy and overcome data sparsity challenges.

In one example, a search query is received and sequence input data is obtained based on the search query. The sequence input data describes a sequence of digital content and respective search queries. Embedding data is generated based on the sequence input data using an embedding module of a machine-learning model. The embedding module includes a query-aware embedding layer that generates embeddings of the sequence of digital content and respective search queries. A search result is generated referencing at least one item of digital content by processing the embedding data using at least one layer of the machine-learning model.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures are indicative of one or more entities and thus reference is made interchangeably to single or plural forms of the entities in the discussion.

DETAILED DESCRIPTION

Overview

Figure 1:
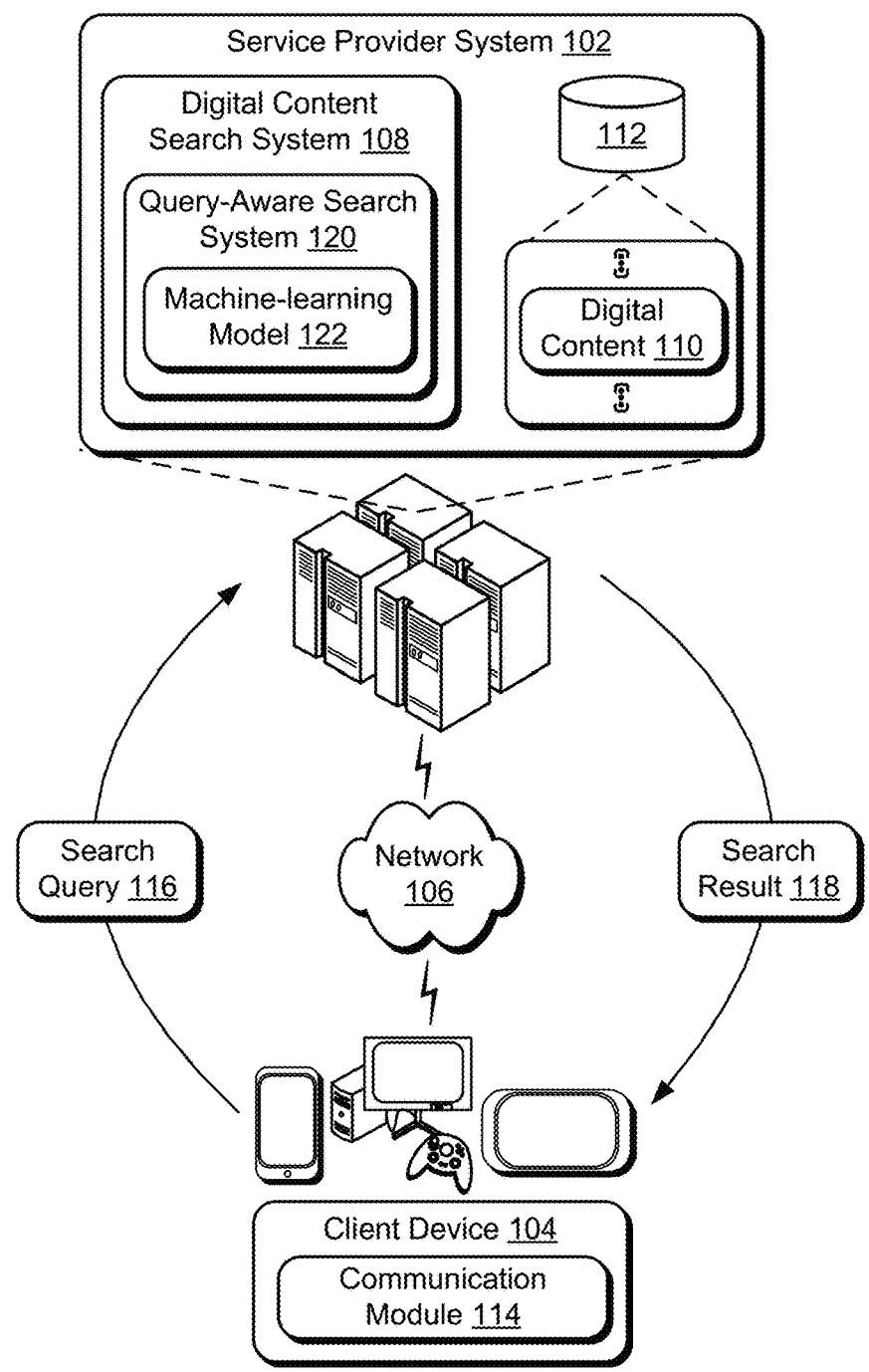
FIG. 1 is an illustration of an environment in an example implementation that is operable to employ digital content search techniques described herein.

Search is one of the primary mechanisms supported by computing devices to locate digital content. Examples of digital content include digital images, digital movies, digital books, digital documents, applications, settings, and so forth. In order to aid in identifying intent of an entity regarding a search query for a particular item of digital content, techniques have been developed to leverage sequences involving interaction with past digital content to infer a likely intent in obtaining future digital content. However, conventional sequence-based search techniques are confronted with data sparsity issues and are challenged with noisy and complex relationships between items in the sequence. This causes accuracy and performance of these conventional techniques to suffer in real-world scenarios.

Accordingly, digital content search techniques are described that overcome the technical challenges found in conventional sequence-based techniques. This is achieved by leveraging search queries used to obtain digital content that is a subject of past interaction as a contextual signal to improve accuracy and clarity of an underlying search intent. These techniques support a general framework to incorporate query information into sequences, improve generalization of a machine-learning model by leveraging search query to digital content linkage information, and expand an ability to generate training data to improve model-training accuracy and overcome data sparsity challenges.

In one example, a query-aware search system obtains input data describing interaction of entities with digital content received in search results from corresponding search queries. A search query "athletic shoes," for instance, is provided to a search system to search for digital images of "athletic shoes." A search result containing representations of these digital images (e.g., as thumbnails with watermarks) is then provided in response. Interaction with the search result is monitored to determine which digital images are selected from the search result, e.g., for purchase, downloading, and so on. Thus, the input data is usable to show correspondence of particular items of digital content selected by entities with search queries used to locate the items, which is not possible in conventional techniques.

The query-aware search system then generates training sequence data from the input data. A variety of sequence types are configurable by the system. In a first example, the sequence is a heterogenous sequence configured as an ordered list, in which, items of digital content follow respective queries over time. In a second example, the sequence is an early fusion sequence in which respective search queries are added as a feature of respective items of digital content. In a third example, the sequence is a late fusion sequence in which a respective sequence of digital content is modeled separately from a respective sequence of search queries used as a basis to obtain the digital content. Other examples are also contemplated.

As described above, conventional sequence-based search techniques suffer from a data sparsity problem and as such result in inaccuracies and inefficient use of computational resources used to implement these techniques. According, in an implementation the query-aware search system is configured to augment training data used to train a machine-learning model to perform sequence-based search techniques. To do so, the query-aware search system constructs a graph having nodes representing digital content linked to nodes representing respective search queries used to obtain the digital content. The nodes of the graph may be filtered by the query-aware search system to reduce noise and capture cooccurrence.

Training sequences are generated by the query-aware search system based on the graph. The sequences describe digital content and corresponding search queries used to obtain the digital content, respectively. Augmented training sequences are also generated by the query-aware search system to expand an amount of training data and thus improve accuracy of a machine-learning model trained using the data. Augmenting the sequences is performable in a variety of ways by the query-aware search system. In a first example, a node of the training sequence is replaced by another node that shares a linkage with the replaced node to a common node in the graph, e.g., for digital content or query nodes in the graph. This may include replacing the particular node as well as other subsequent nodes linked to the replacement node in the graph to create the augmented training sequence. In another example, nodes are replaced based on semantic similarity to other nodes in the graph (e.g., through natural language processing based on nearness of respective vectors in an embedding space), which is again performable for the single node and/or additional nodes linked to the replacement node in the graph.

The training data is then used by the query-aware search system to train a machine-learning model using machine learning to perform a search of digital content. The machine-learning model, for instance, includes an embedding layer that generates embedding data based on the training sequences of digital content and associated search queries. Additional layers (e.g., transformer layers) are then used to generate the search result based on the embedding data. A training loss is employed by the query-aware search system as part of the training. The training loss is based on a candidate item of digital content that is predicted to be a subject of subject user interaction and not a candidate search query generated by the model. This improves efficiency of the system during training and accuracy of the underlying goal, i.e., to predict a particular item of digital content.

Once trained, the machine-learning model is configured to generate a search result by the query-aware search system for subsequent search queries. The query-aware search system, for instance, receives a search query from an entity and based on this obtains sequence input data describe a sequence of digital content, with which, the entity has interacted in the past. Additional examples are also contemplated, e.g., for sequences generated by other entities that have been determined as similar to an entity that originated a current search query.

This sequence (which may include the search query) is then processed by the machine-learning model to generate a search result that references an item of digital content. In this way, the search queries, as part of the sequence, provide additional insight into a likely intent underlying the search query. This improves search accuracy and improves efficiencies in use of computational resources employed to implement the query-aware search system due to this increased accuracy. Further discussion of these and other examples is included in the following sections and shown using corresponding figures.

In the following discussion, an example environment is described that employs the techniques described herein. Example procedures are also described that are performable in the example environment as well as other environments. Consequently, performance of the example procedures is not limited to the example environment and the example environment is not limited to performance of the example procedures.

Example Digital Medium Environment

FIG. 1 is an illustration of a digital medium environment 100 in an example implementation that is operable to employ digital content search techniques described herein. The illustrated environment 100 includes a service provider system 102 and a client device 104 that are communicatively coupled, one to another, via a network 106. The service provider system 102 and client device 104 are implemented via respective computing devices, which are configurable in a variety of ways.

A computing device, for instance, is configurable as a desktop computer, a laptop computer, a mobile device (e.g., assuming a handheld configuration such as a tablet or mobile phone), and so forth. Thus, computing devices range from full resource devices with substantial memory and processor resources (e.g., personal computers, game consoles) to a low-resource devices with limited memory and/or processing resources (e.g., mobile devices). Additionally, a computing device is also representative of a plurality of different devices, such as multiple servers utilized by a business to perform operations "over the cloud" as shown for the service provider system 102 and as described in relation to FIG. 12.

The service provider system 102 includes a digital content search system 108 that is representative of functionality to support a search of digital content 110, which although illustrated as stored in a storage device 112 locally is also available remotely via the network 106. Digital content 110 is configurable in a variety of ways, examples of which include digital images, digital music, digital documents, applications, settings, digital media, digital movies, digital books, and so forth.

An entity (e.g., a "user"), for instance, interacts with a user interface output by a communication module 114 (e.g., browser, network-enabled application, etc.) at a client device 104 to specify a search query 116. The search query 116 is then communicated via the network 106 to the digital content search system 108. The digital content search system 108 performs a search of the digital content 110 based on the search query 116 and returns a search result 118, e.g., having representations of the digital content 110 or the content itself. Although the described example involves network 106 communication, local search techniques are also contemplated, e.g., to perform a search for digital content locally at the client device 104 by the digital content search system 108 without involving network 106 communication.

As previously described, a goal of search is to correctly infer an intent behind a search query 116. One such example of functionality usable to infer intent is represented as a query-aware search system 120. The query-aware search system 120 is configured to leverage sequences of past interaction of an entity with the digital content 110 and search queries 116 that are used to obtain the digital content 110. This is used by the query-aware search system 120 to infer additional information about the entity's intent regarding a current search query.

Use of sequences of descriptions of digital content 110, with which, an entity has interacted captures evolving interests of the entity and item-to-item transition patterns. However, extracting relevant and accurate signals from the sequences is challenging. For example, intent may gradually evolve over time or change suddenly, leading to an erosion of the context among items in the sequence in both instances.

To mitigate such challenges to effectively and accurately predict an underlying intent among complex and noisy behavior sequences, search queries 116 are leveraged by the query-aware search system 120 to provide a contextual cue to reflect and predict evolving intent behind the search queries 116. Use of search queries by the query-aware search system 120 supports a variety of functionality. In a first example, search queries 116 reflect intent granularity. For example, search queries such as "wallpaper" and "hot-air balloon" suggest not only an underlying target of the intent of the queries but also a desire for content diversity in a particular context. Second, search queries provide insight into connections between different interactions, which can improve accuracy especially for rare interactions with digital content.

Third, search queries help to detect an entity's intent "boundaries." In one scenario, a search query of "wallpaper" followed by a search query of "wallpaper landscape" is indicative of a refinement of interests. In another scenario, a search query of "mountain & water" followed by a search query of "hot-air balloon" indicates unrelated intent. Both scenarios employ different semantics in terms of how relationships are to be addressed among sequential interactions.

Accordingly, the query-aware search system 120 employs a machine-learning model 122 that considers search queries as part of a sequence of interaction with digital content 110. As such, the query-aware search system 120 incorporates search queries into the sequences as additional insights into a likely intent of the interactions with digital content in the sequences. This is performable in a variety of ways by the machine-learning model 122, such as to treat search queries as special interactions in sequences, incorporate search queries into item sequences, (e.g., by treating search queries as features of a corresponding item), and so on. As such, the query-aware search system 120 is configured to leverage query-item linkage information to improve an ability to generalize the machine-learning model 122 through use of graph-based sequence augmentation. This enables the query-aware search system 120 to incorporate search queries as a contextual cue to reflect and predict intent of a subsequent search query. In the following sections, a general framework is described using sequences and graph-based sequence augmentation. A self-attentive machine-learning model is also described as incorporated under this framework. Further discussion of these and other examples is included in the following sections and shown in corresponding figures.

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable together and/or combinable in different ways. Thus, individual functionality, features, and concepts described in relation to different example environments, devices, components, figures, and procedures herein are usable in any suitable combinations and are not limited to the particular combinations represented by the enumerated examples in this description.

Digital Content Query-Aware Sequential Search

Figure 2:
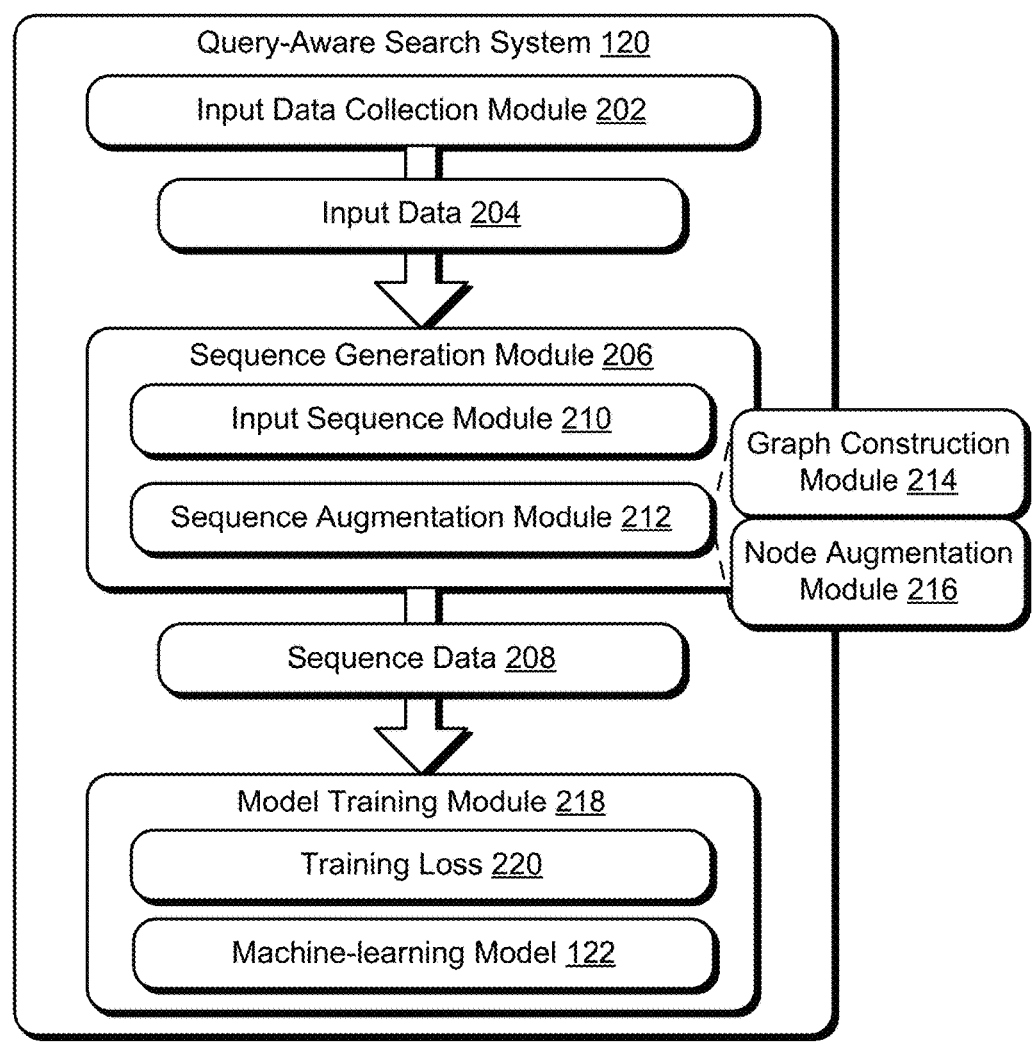
FIG. 2 depicts a system in an example implementation of training of a machine-learning model of FIG. 1 in greater detail.
Figure 3:
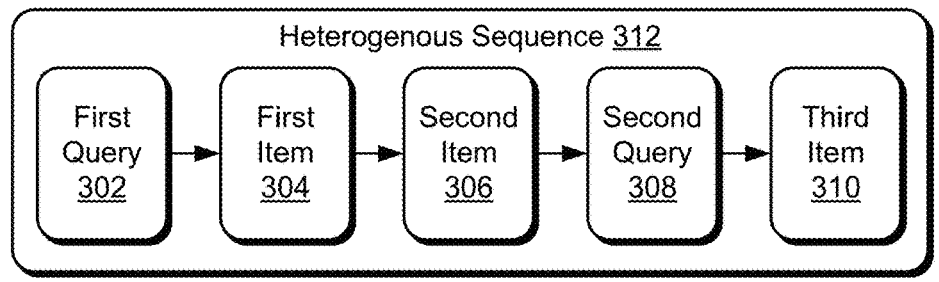
FIG. 3 depicts examples of sequences generated by the query-aware search system of FIG. 2 from input data usable for training and search.
Figure 3:
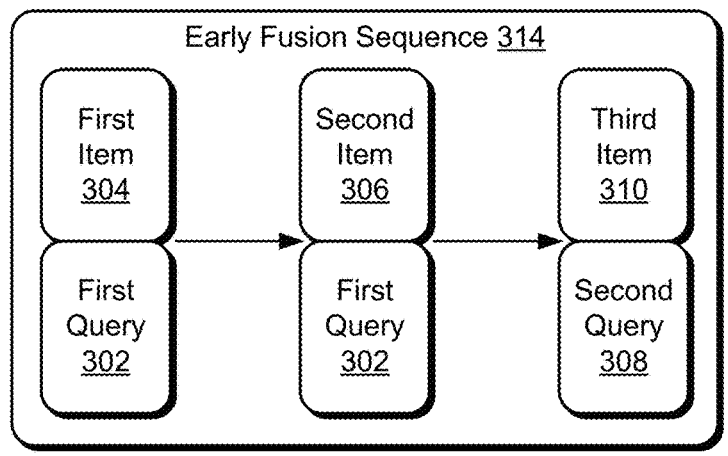
Figure 3:
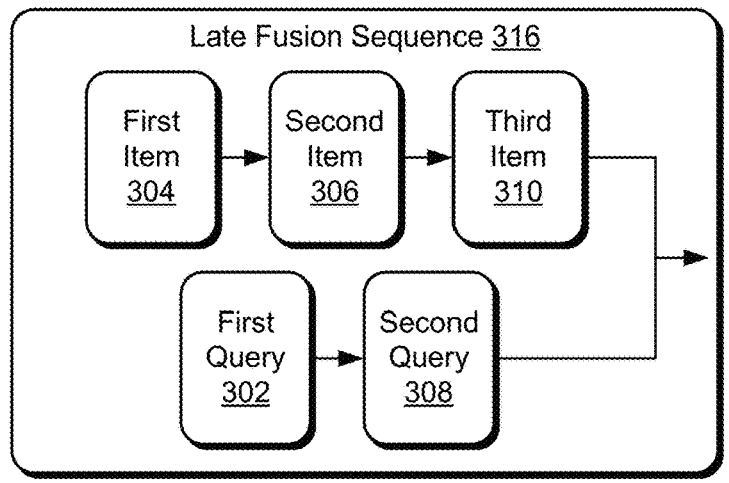
Figure 4:
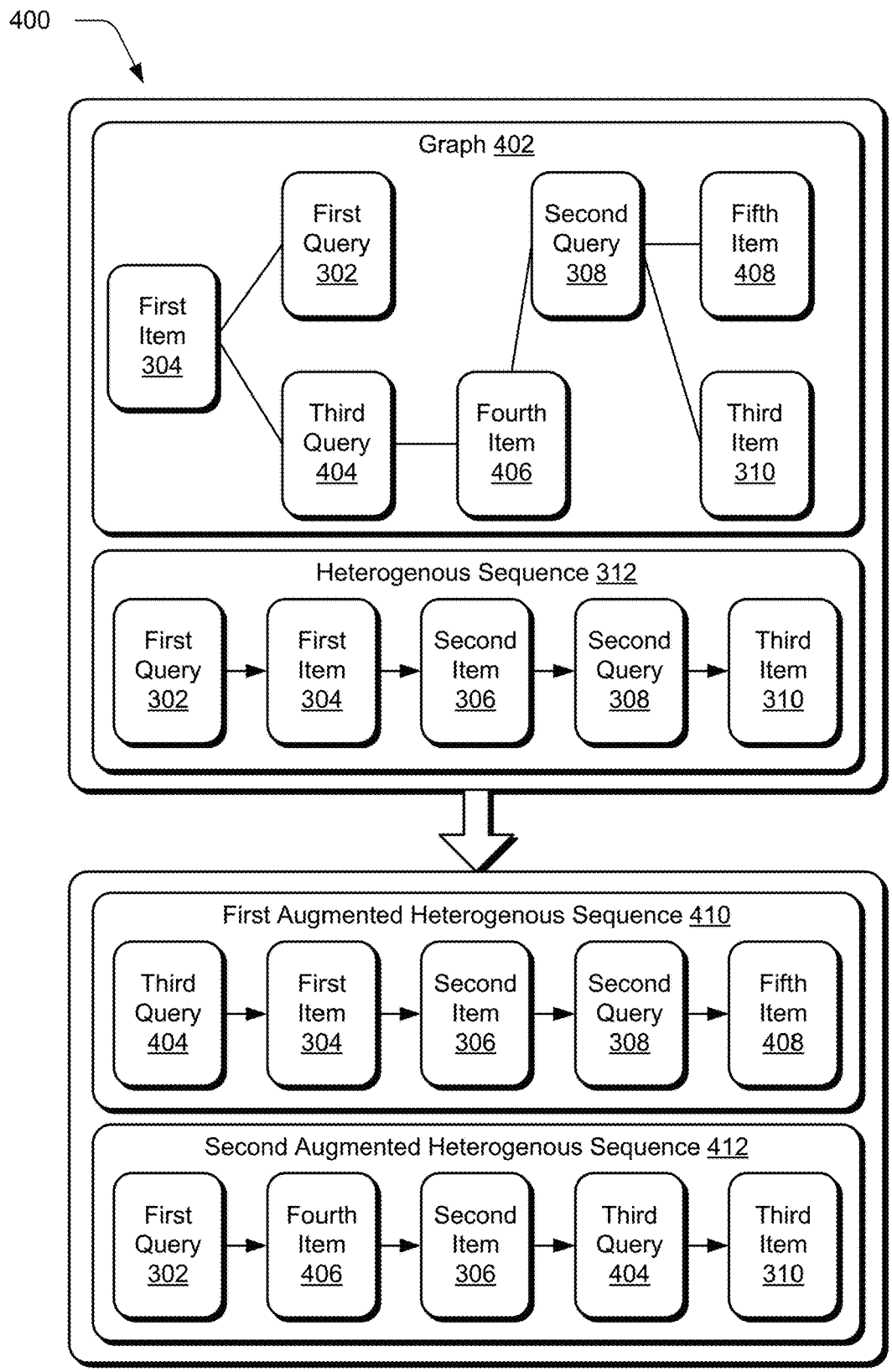
FIG. 4 depicts an example of generating an augmented sequence using a sequence augmentation module of FIG. 2 usable for training and search.
Figure 5:
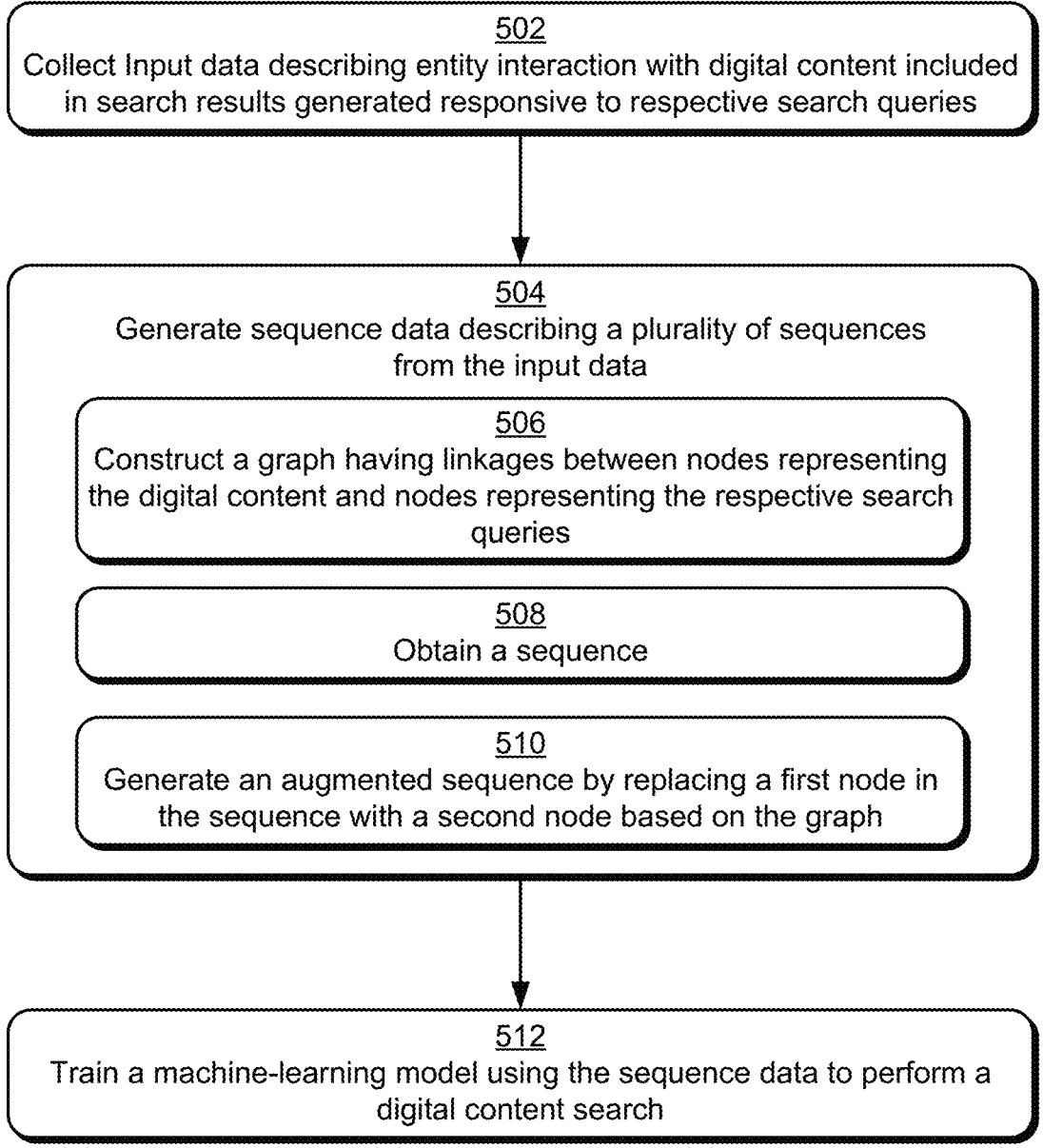
FIG. 5 is a flow diagram illustrating a procedure in an example implementation of training a machine-learning model using training data generated by a sequence generation module of FIG. 2.
Figure 6:
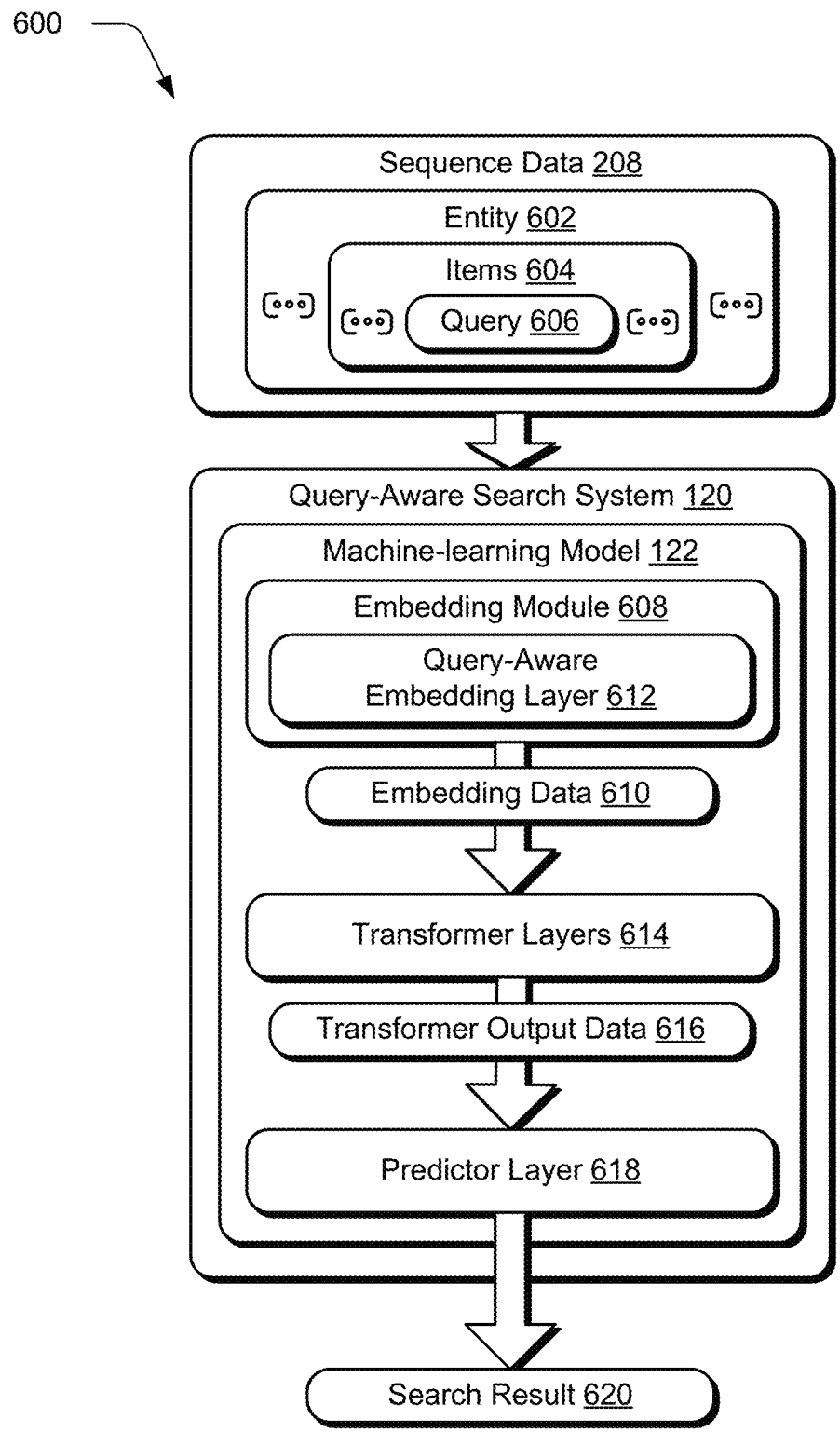
FIG. 6 depicts an example of the machine-learning model of FIG. 2 in greater detail.
Figure 7:
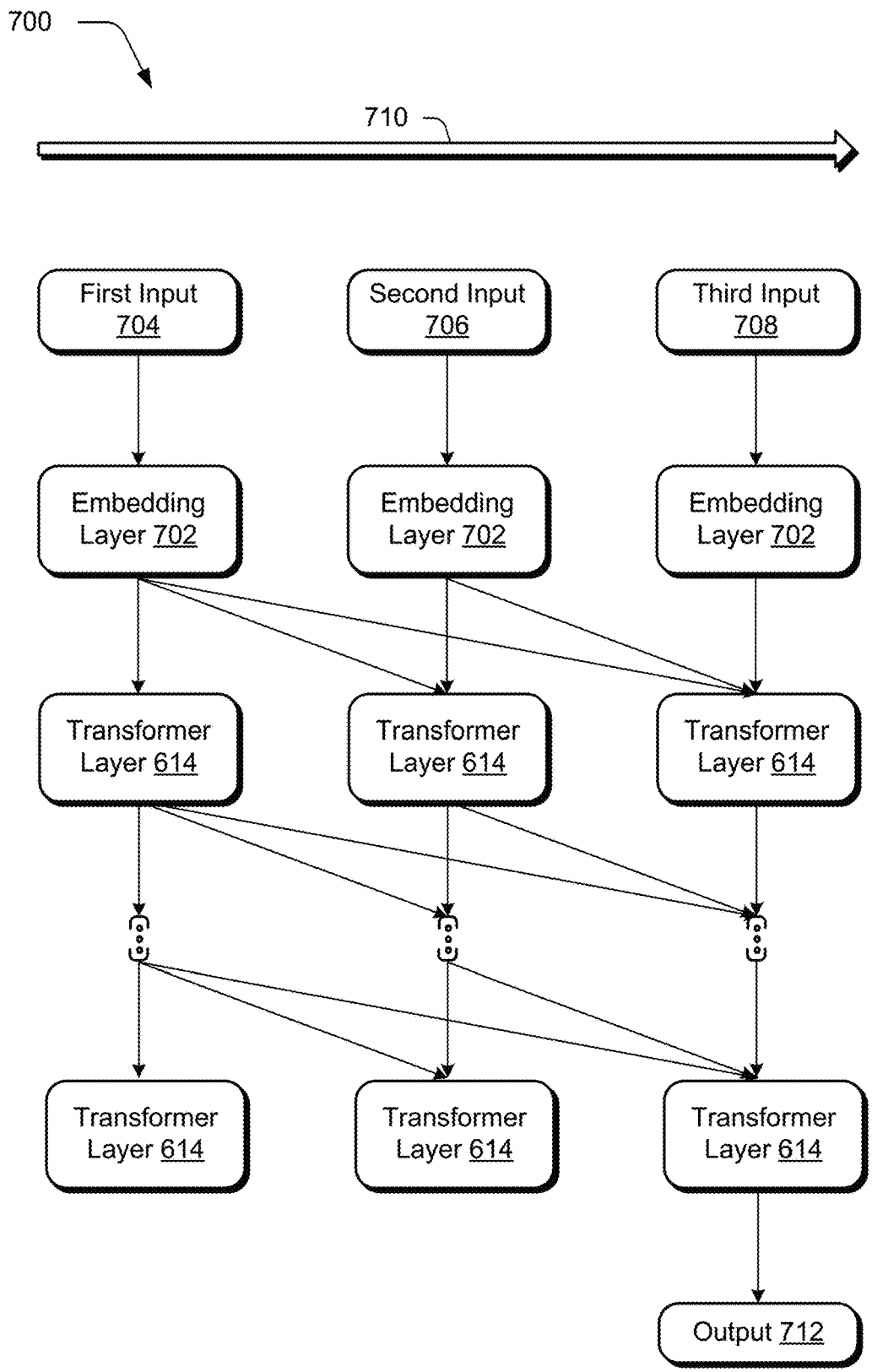
FIG. 7 depicts an example of training the machine-learning model of FIG. 6 in greater detail.
Figure 8:
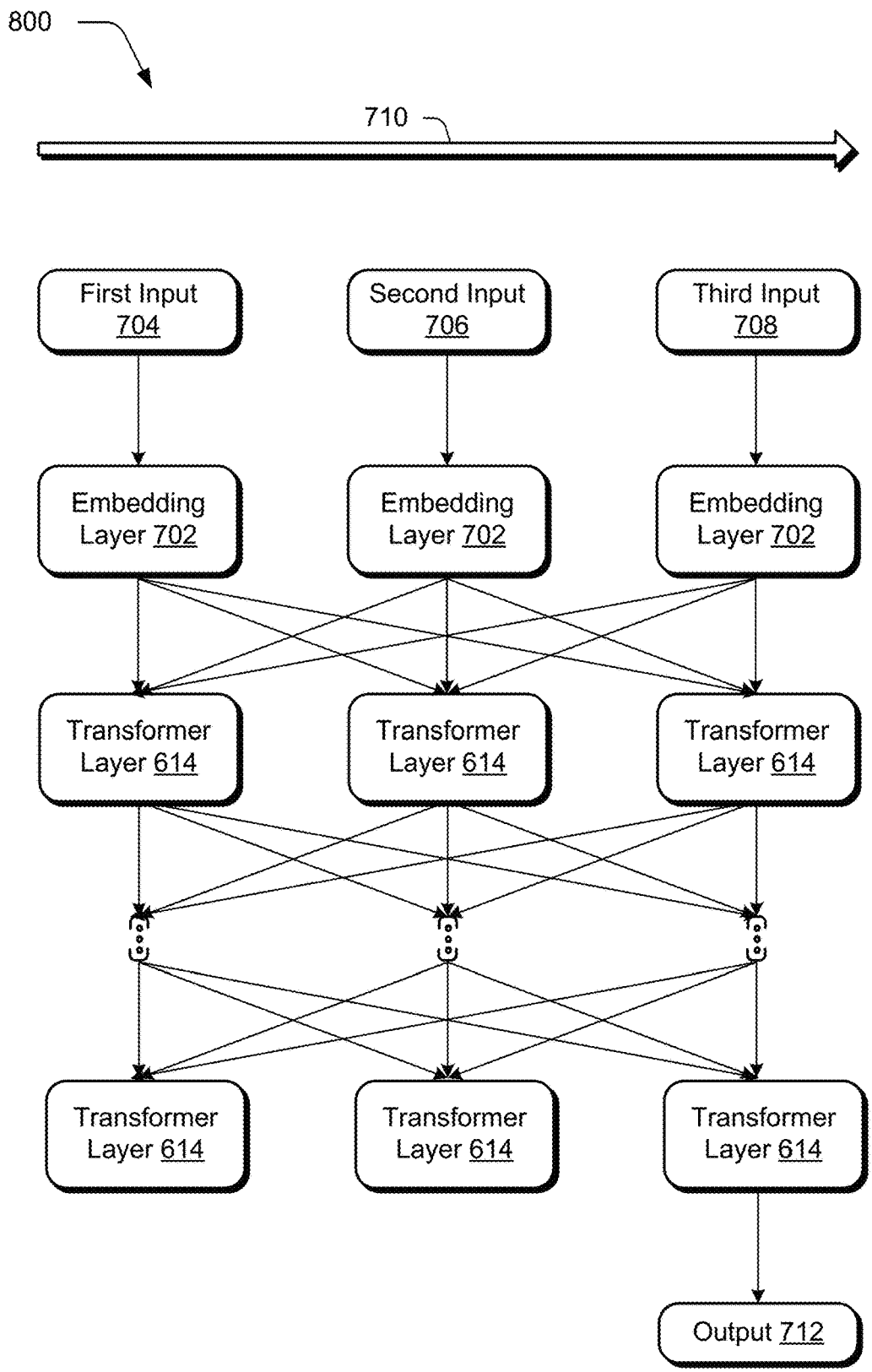
FIG. 8 depicts an example of transformer layers of the machine-learning model of FIG. 2 as implementing a uni-directional self-attention mechanism configured to consider previous items in a sequence.
Figure 9:
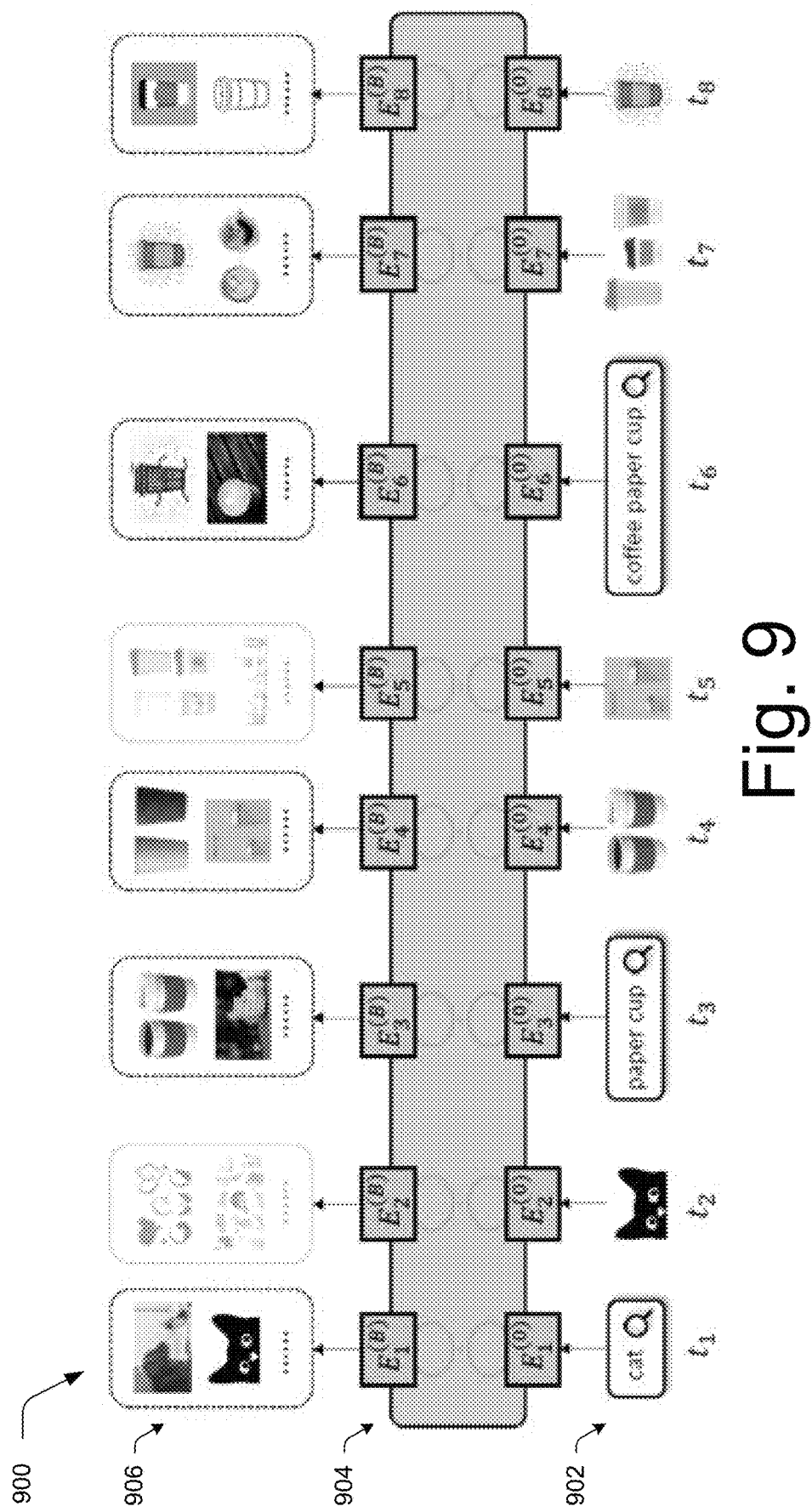
FIG. 9 depicts an example of transformer layers of the machine-learning model of FIG. 2 as implementing a bidirectional self-attention mechanism.

FIG. 2 depicts a system 200 in an example implementation of training of the machine-learning model 122 of FIG. 1 in greater detail. FIG. 3 depicts examples 300 of sequences generated by the query-aware search system 120 from input data of FIG. 2. FIG. 4 depict an example 400 of generating an augmented sequence using a sequence augmentation module of FIG. 2. FIG. 5 is a procedure 500 in an example implementation of training the machine-learning model 122 using training data generated by a sequence generation module of FIG. 2. FIG. 6 depicts an example 600 of the machine-learning model 122 of FIG. 2 in greater detail. FIG. 7 depicts an example of training the machine-learning model 122 of FIG. 6 in greater detail. FIG. 8 depicts an example 800 of transformer layers of the machine-learning model 122 of FIG. 2 as implementing a self-attention mechanism that considers previous items in a sequence. FIG. 9 depicts an example 900 of transformer layers of the machine-learning model 122 of FIG. 2 as implementing a bidirectional self-attention mechanism.

Figure 10:
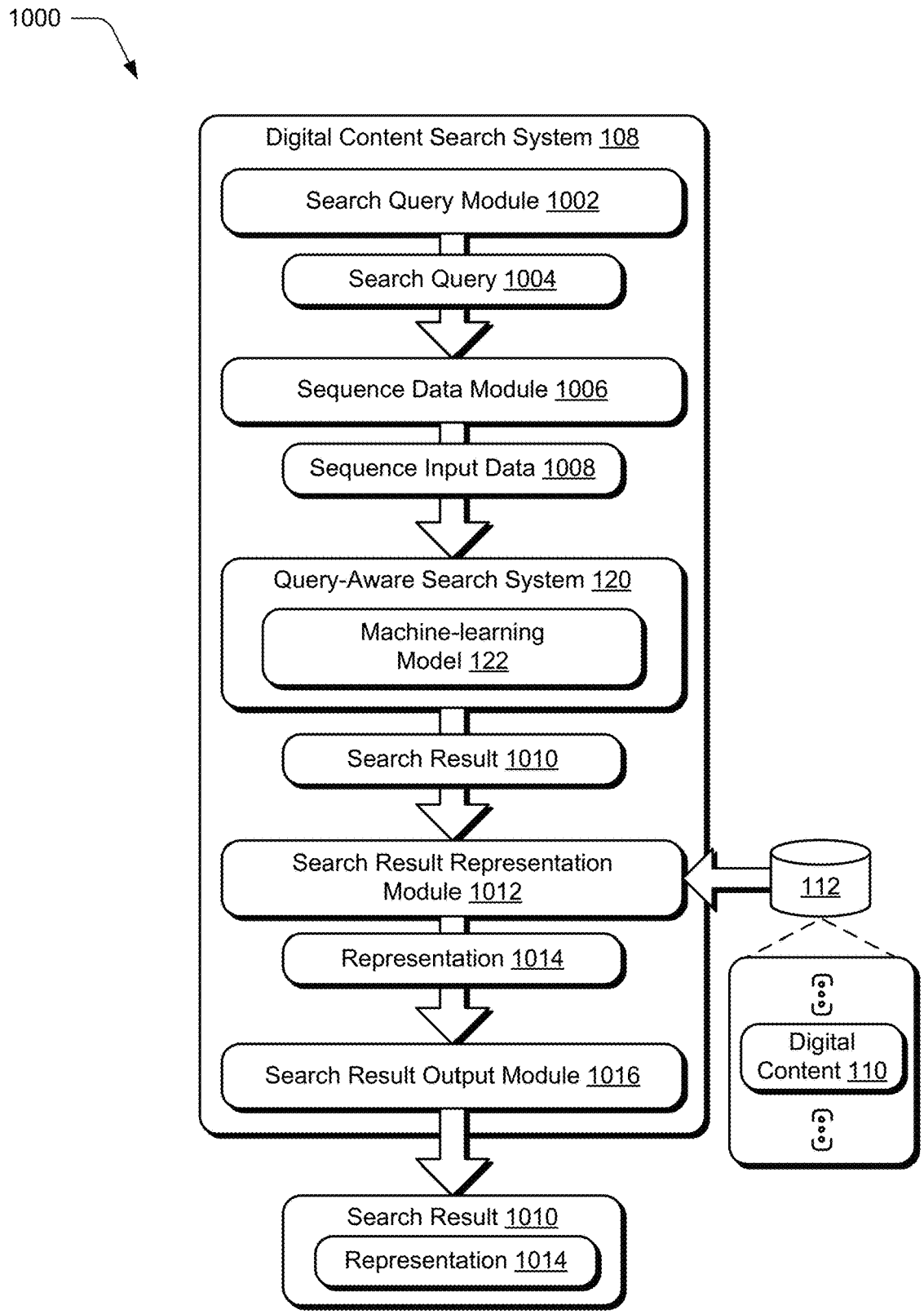
FIG. 10 is an illustration of an example of the machine-learning model trained as described in relation to FIG. 7 as performing a search of digital content.
Figure 11:
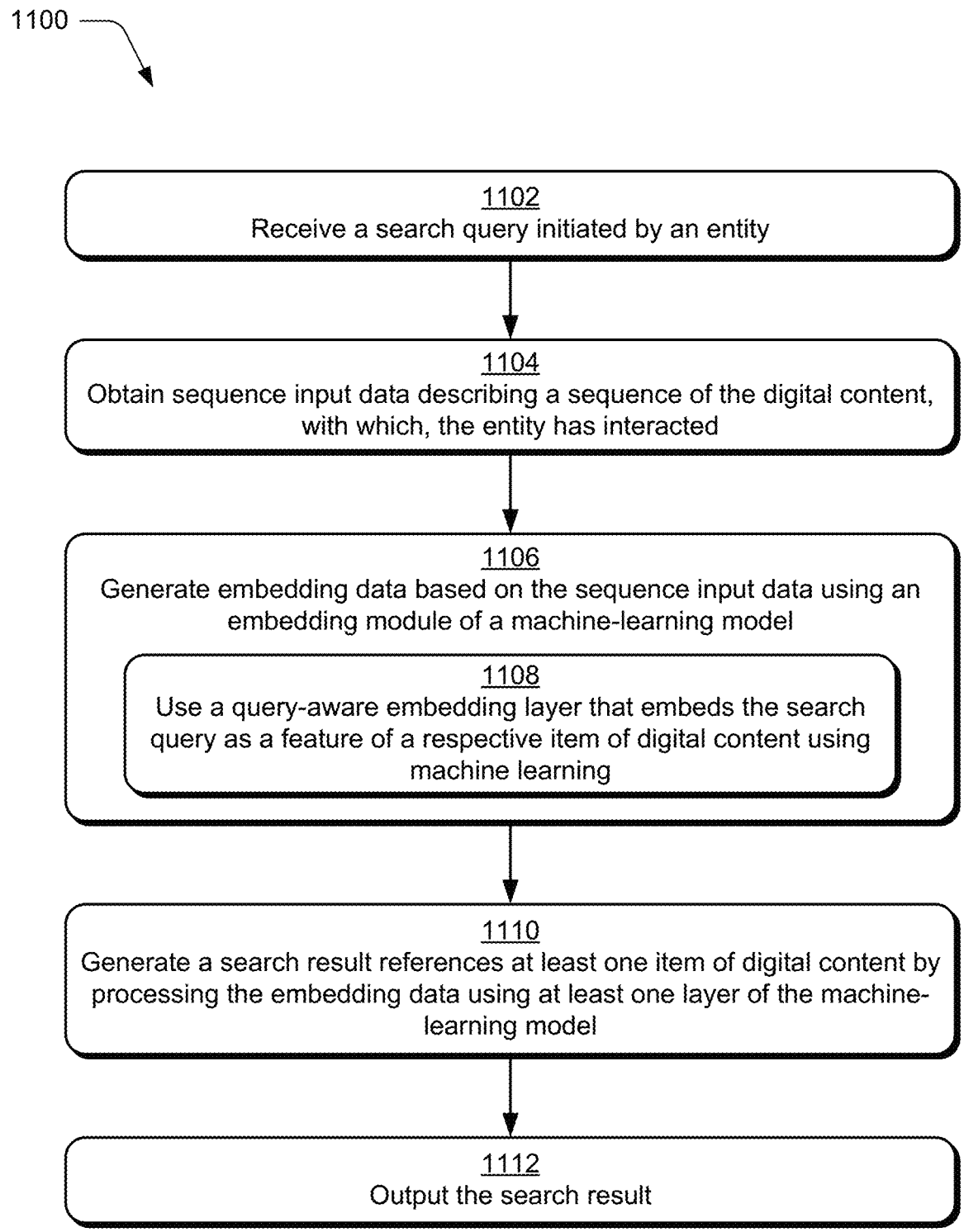
FIG. 11 is a procedure in an example implementation of use of the machine-learning model trained as described in relation to FIG. 5 to perform a digital content search.

FIG. 10 is an illustration of an example 1000 of the machine-learning model 122 trained as described in relation to FIG. 7 as performing a search of digital content. FIG. 11 is a procedure 1100 in an example implementation of use of the machine-learning model 122 trained as described in relation to FIG. 5 to perform a digital content search.

The following discussion describes techniques that are implementable utilizing the previously described systems and devices. Aspects of each of the procedures are implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-11.

To begin in this example, the query-aware search system 120 employs an input data collection module 202 to collect input data 204 describing entity interaction with digital content 110 included in search results. The search results 118 are generated responsive to respective search queries 116 (block 502). The query-aware search system 120, for instance, monitors interaction of respective entities in initiating search queries 116, receiving respective search results 118, and interacting with items of digital content 110 referenced by the search results 118. This interaction reflects interest in respective items of digital content 110 and thus an underlying goal of the search query 116.

In a stock digital image example, a search query 116 "athletic shoes" is received by the digital content search system 108. The search query 116 is used to search digital content 110 (e.g., digital images in this example) which is used to generate a search result 118. Interaction with the search result 118 is monitored by the input data collection module 202 to generate the input data 204 as describing items of digital content 110 selected from the search result 118. The input data 204 also describes a search query 116 used to initiate generation of the search result 118. A user input, for instance, is received as selecting a representation (e.g., thumbnail) of a particular digital image for purchase, e.g., as part of a subscription, one-time-payments, and so on. In this way, the input data 204 is generated for and associated with a plurality of different entities, e.g., based on respective user IDs of users of a stock digital image service or other service provider system 102 configuration.

A sequence generation module 206 is then employed to generate sequence data 208 from the input data 204 (block 504). To do so, an input sequence module 210 is employed to generate sequences describing interaction with digital content 110 and search queries 116 used to locate the digital content 110, respectively. Sequences are configurable in a variety of ways.

FIG. 3 depicts examples 300 of sequence configurations generated based on input data 204 describing a first query 302 that resulted in interaction with a first item 304 and a second item 306 and a second query 308 that resulted in interaction with a third item 310 of digital content 110. The input data 204 is employed in this example by the input sequence module 210 to generate a heterogenous sequence 312, an early fusion sequence 314, and a late fusion sequence 316 from the input data 204.

A heterogenous sequence 312 is configured such that search queries 116 and digital content 110 that is a subject of interaction is ordered based on when the search queries and interactions occurred, e.g., based on timestamps to reflect a sequence occurring over time. For the illustrated example, a first query is followed by interaction with a first item 304 and second item 306 of digital content 110. This is followed, temporally, by a second query 308 and associated third item 310 of digital content 110 that is located via a search initiated by the second query 308.

The early fusion sequence 314, on the other hand, is configured such that search queries 116 are considered features of respective items of digital content 110. This is illustrated as the first item 304 incorporating features of the first query 302, the second item incorporating features of the first query 302, and the third item 310 incorporating features of the second query 308. In a late fusion sequence 316, a sequence of the first, second, and third items 304, 306, 310 of digital content are modeled separately than a sequence of first and second queries 302, 308 used to locate the items.

Expressed mathematically, given a set of entities "U" (e.g., users) and an item set "I" of digital content 110, and a set of interaction sequences "S— {$S_1$, . . . , $S_{|U|}$}," each sequence "$S_u$" includes chronologically ordered interactions expressed as follows:

$$S_u = [i_1^{(u)}, i_2^{(u)}, \ldots, i_{T_u}^{(u)}]$$

where $$S_u \in S, u \in \mathcal{U}, i_t^{(u)} \in \mathcal{I}$$

is an item of digital content 110 selected by an entity at timestep "t" and "$T_u$" is a length of the sequence.

Search queries are added as an additional query set "Q" and a word vocabulary "V", where a query "q ∈ Q" includes a list of words "[v1, . . . , v|q|], v ∈ V." Sequences are collected to enrich the sequence "$S_u$" above to a heterogeneous sequence:

$$\hat{S}_u$$

which includes entity "u's" search queries and respective item interactions in chronological order as follows:

$$\hat{S}_u = [\hat{\imath}_1^{(u)}, \hat{\imath}_2^{(u)}, \ldots, \hat{\imath}_{\hat{T}_u}^{(u)}]$$

where $$\hat{T}_u$$

is a length of the sequence. In heterogenous sequences, a notation of:

$$\hat{s}_t^{(u)}$$

is representative of an item interaction or a query action. The notation of "δ" is used to indicate whether $$\hat{s}_t^{(u)}$$

at "t-th" step is an item interaction as follows:

$$\hat{s}_t^{(u)} \in \begin{cases} \mathcal{I}, & \text{if } \delta(\hat{s}_t^{(u)}) = 1 \\ Q, & \text{otherwise} \end{cases}.$$

Accordingly, a goal of the machine-learning model 122 is to predict a new item of digital content 110, with which, the entity desires to interact based on a search query based on a given the search query and item history:

$$\hat{S}_U$$

This is expressed in the following discussion by modeling the probability of each possible item of digital content 110 for the entity's next interaction as follows:

$$P(\hat{s}_{\hat{T}_u+1}^{(u)} = i^* | \hat{S}_u, \delta(\hat{s}_{\hat{T}_u+1}^{(u)}) = 1)$$

where $$\delta(\hat{s}_{\hat{T}_u+1}^{(u)}) = 1$$

indicates that the next step involves an item interaction, and $$\hat{s}_{\hat{T}_u+1}^{(u)} = i^*$$

denotes that "i*∈ I" is an item of digital content that is a subject of interaction at next step:

$$\hat{i}_{u+1}$$

For an early fusion sequence 314, search queries are treated as features of items of digital content 110. That is, if a latest search query is "$q_t$" before selection of an item "$i_t$," "$(i_t, q_t)$" is used to incorporate query features into this item interaction. As a result, search queries function as an extra item feature to "$i_t$." This supports an ability to expand existing techniques to include item features into search.

For a late fusion sequence 316, search queries are incorporated as profile information associated with the entity. This is performed by modeling interaction sequences with digital content 110 separately from sequences of search queries 116 as shown for the late fusion sequence 316 of FIG. 3. In this way, a history of the search queries 116 acts as a profile to personalize preferences when modeling sequences of items of digital content 110 for a particular entity. A variety of other examples are also contemplated.

As previously described, conventional sequence-based search techniques suffer from issues of data sparsity, a result of which causes machine-learning models trained using these techniques to produce results that lack accuracy and involve inefficient use of computational resources. To address this, the sequence generation module 206 includes a sequence augmentation module 212 that is configured to generate augmented sequences to further expand an amount of sequences usable to train the machine-learning model 122. This improves accuracy and operation of computing devices that employ the described query-aware sequential search techniques.

Augmented sequences are constructible in a variety of ways. As illustrated in FIG. 2, the sequence augmentation module 212 includes a graph construction module 214 and a node augmentation module 216. The graph construction module 214 is configured to construct a graph having links between nodes representing the digital content and nodes representing the respective search queries (block 506). A sequence is obtained (block 508), and from this, the node augmentation module 216 is configured to generate an augmented sequence by replacing a first node in the sequence with a second node (block 510). This is performable in a variety of ways.

FIG. 4, for instance, illustrates an example 400 of generating augmented sequences for use in training a machine-learning model 122. The graph construction module 214 is configured to generate a graph 402 based on the input data 204. The illustrated graph 402 includes nodes representing a first item 304, a third item 310, a fourth item 406, and a fifth item 408 of digital content 110 that is a subject of user interaction, e.g., a "click" or other selection input. The graph 402 also includes nodes representing a first query 302, a second query 308, and a third query 404.

Links (e.g., edges in the graph 402) are formed to associate nodes representing items of digital content with nodes representing search queries used to obtain the items, e.g., as part of a search result. In the illustrated example, the first item 304 includes links to the first query 302 and the third query 404. The fourth item 406 include links to the third query 404 and the second query 308. The third item 310 and the fifth item 408 also include links to the second query 308.

A heterogenous sequence 312 is also obtained (e.g., from an input sequence module 210), which may be generated from the graph 402 or otherwise. The node augmentation module 216 then employs the heterogenous sequence 312 to generate first and second augmented heterogenous sequences 410, 412 by replacing nodes. This is performable in a variety of ways.

In a first example, nodes are replaced with nodes that share links to common nodes in the graph 402. The first query 302 and the third query 404, for instance, are both linked to a common node of a first item 304. Likewise, a third item 310 and a fifth item 408 are both linked to a common node of a second query 308. Therefore, a node corresponding to the first query 302 in the heterogenous sequence 312 is replaced by the node augmentation module 216 with a node corresponding to the third query 404. Additionally, a node corresponding to the third item 310 is replaced by the node augmentation module 216 with a node corresponding to the fifth item 408 of digital content. These replacements form a first augmented heterogenous sequence 410.

Likewise, in a second example the first item 304 and the fourth item 406 share a common node of a third query 404. Therefore, a node corresponding to the first item 304 in the heterogenous sequence 312 is replaced by the node augmentation module 216 with a node corresponding to the fourth item 406. Additionally, the second query 308 and the third query 404 share a common node of a fourth item 406. Therefore, a node corresponding to the second query 308 is replaced by the node augmentation module 216 with a node corresponding to the third query 404 to form the second augmented heterogenous sequence 412. Other examples are also contemplated, such as to replace nodes with other nodes from the graph 402 (or other source) based on semantic similarity. This is performable based on closeness of vectors of the respective nodes in an embedding space using machine learning as part of natural language understanding techniques.

Described mathematically, "$\hat{S}$" is an input sequence that is augmented to "K" input sequences "$\hat{S}^{(1)}, \hat{S}^{(2)}, \ldots, \hat{S}^{(K)}$" by stochastically replacing item "i" or query "q" with semantically similar items or queries, where query-item links provide hints as to semantic similarities.

In order to construct the graph by the graph construction module 214, the query-item graph is denoted as "G=(A,E)," where "A=Q ∪ I" represents item and query nodes. The edge set "E" denotes links between queries and items, i.e., "(q→i) or (i→q) ∈ E." Neighbors of item "i" are denoted as "N(i)={q (i→q)∈ E}," and "N(q)" is defined similarly. In particular, the query-item edges are defined in two steps: (1) connect item "i" with its latest query "q" to build an initial edge set "E1;" and (2) to reduce query/item mismatches and retain confident links, a threshold "α" is set to retain a top "⌈α|N(i)|⌉" links for item "i" and top "⌈α|N(q)|⌉" links for query "q." This results in "E=Eα," noting that "α" is used to trade off between the coverage and confidence of query-item links, where "0<α≤1."

The node augmentation module 216 adopts a data augmentation strategy following a stochastic shared embedding (SSE) techniques based on the constructed graph. For "$\hat{s}^t \in \hat{S}^t$" "$\hat{s}^t$" is replaced based on the following principle:

$$i \sim \hat{s}_t, j \not\sim \hat{s}_t \rightarrow p(i,\hat{s}_t)/p(j,\hat{s}_t)=\rho, \text{if } \delta(\hat{s}_t)=1, i,j \in I$$

$$q \sim \hat{s}_t, j \not\sim \hat{s}_t \rightarrow p(q,\hat{s}_t)/p(k,\hat{s}_t)=\rho, \text{if } \delta(\hat{s}_t)=0, q,k \in Q$$

Here "p(·,·)" is the replacement probability, and "ρ" is a constant greater than 1. The values "~" and "(≁)" are used to denote whether two nodes are similar For example, given a graph "G," similar queries are defined as "q~k" when "q" and "k" have common neighbors(s), i.e., "N(q)∩N(k)≠∅." This leverages insight provided by the graph to identify nodes (e.g., "café" and "coffee") which have links to common neighbors are likely similar, and so are candidates to be replaced by each other for data augmentation. Efficiencies described above permit the sequence augmentation module 212 to perform these techniques in real time (i.e., "on-the-fly") for each training epoch rather than generating each augmented sequence in advance.

The sequence data 208, which may include the augmented sequences, are then passed as training sequences in this example to a model training module 218. The model training module 218 is configured to train the machine-learning model 122 using the sequence data 208 to perform a digital content search (block 512) as further described below using a training loss 220. The machine-learning model 122 is configurable using a variety of different architectures, an example of which is described as follows.

FIG. 6 depicts an example 600 of the machine-learning module 122 as incorporating a transformer architecture. A transformer architecture is a type of machine-learning model that employs an attention mechanism to weight significance of each of the items in the sequence for generating an output, e.g., the search result 620. The sequence data 208 is obtained form an entity 602 corresponding to a received search query and describes items 604 of digital content 110 and corresponding queries 606 used to locate the digital content. An embedding module 608 is implemented to generate embedding data 610 using a query-aware embedding layer 612. Transformer layers 614 then process the embedding data 610 to generate transformer output data 616 that is utilized by a predictor layer 618 to generate the search result 620.

In one example, the machine-learning model 122 processes heterogeneous sequences as an input for the query-aware based transformed model. An embedding matrix of:

$$M \in \mathbb{R}^{|\mathcal{I}| \times d}$$

is used for item interactions, an embedding matrix of:

$$V \in \mathbb{R}^{|\mathcal{V}| \times d}$$

is used for words of query interactions, and an embedding matrix of:

$$B \in \mathbb{R}^{2 \times d}$$

is used for timestep interactions, respectively, where "d" is hidden dimensionality.

Given item "i" and timestep (position) "t," corresponding embedding "$M_i$," "$P_t$," are looked up from the embedding matrices, respectively. For query:

$$q = (v_1, \ldots, v_{|q|})$$

corresponding embeddings:

$$W_q \in \mathbb{R}^{|q| \times d}$$

are retrieved from a vocabulary embedding matrix "V." To unify a size of "$W_q$" for different queries "q," an average pooling operation is adopted to get a query representation:

$$\overline{W}_q \in \mathbb{R}^{1 \times d}$$

Other techniques may also be employed examples of which include use a hidden vector from a LSTM model, average pooling following a bag-of-words paradigm, or a class vector from a bidirectional model as described by Xusong Chen, Dong Liu, Chenyi Lei, Rui Li, Zheng-Jun Zha, and Zhiwei Xiong. 2019. BERT4SessRec: Content-Based Video Relevance Prediction with Bidirectional Encoder Representations from Transformer. *In Proceedings of the 27th ACM International Conference on Multimedia*. 2597-2601, which is hereby incorporated by reference in its entirety. In order to get an interaction type, a lookup is performed using the embedding matrix of:

$$B \in \mathbb{R}^{2 \times d}$$

to obtain different interaction types.

For the query-aware embedding layer 612, given a heterogeneous sequence "$\hat{S}$" as described above, the input embedding matrix from the embedding layer "Emb" is retrieved as follows:

$$E^{(0)} = Emb(\hat{S}) = \begin{bmatrix} Enc(\hat{s}_1) + P_1 \\ Enc(\hat{s}_1) + P_2 \\ \ldots \\ Enc(\hat{s}_{\hat{N}}) + P_{\hat{N}} \end{bmatrix}$$

where "+" means element-wise addition and:

$$E^{(0)} \in \mathbb{R}^{\hat{N} \times d}$$

is the input embedding matrix. Here item and query representations are learned in a joint embedding space and are aware of sequential order by positional (timestep) embeddings. With interaction type embeddings "B," the encoder "Enc" is defined as:

$$Enc(\hat{s}_t) = \begin{cases} M_{\hat{s}_t} + B_1, & \text{if } \delta(\hat{s}_t) = 1 \\ \overline{W}_{\hat{s}_t} + B_2, & \text{otherwise} \end{cases}$$

For the transformer layers 614, a variety of architectures are employable. The "Trm" transformed block are stacked as:

$$E^{(b)} = Trm(E^{(b-1)}), \text{ where } b = 1, \ldots, B$$

In one example, the techniques are incorporated as part of a multi-head self-attention module of a transformer using machine learning. In a multi-head self-attention module, each attention head is used to compute attention scores that are then combined together to produce a final attention score.

In an example 700 of FIG. 7, embedding layers 702 of the embedding module 608 and transformer layers 614 are configured as part of a unidirectional model. At each transformer layer 614, representations are passed forward step-by-step at each position by passing information forward from previous positions for the first, second, and third inputs 704, 706, 708 originated over successive points in time 710 to generate an output 712. An example of a unidirectional model is described by Wang-Cheng Kang and Julian McAuley. 2018. Self-attentive sequential recommendation. *In 2018 IEEE International Conference on Data Mining (ICDM)*. IEEE, 197-206, which is hereby incorporated by reference in its entirety.

In an example 800 of FIG. 8, embedding layers 702 of the embedding module 608 and transformer layers 614 are configured as part of a bidirectional model. At each transformer layer 614, representations are revised at each position by exchanging information across each of the positions at a previous transformer layer 614 in parallel for the first, second, and third inputs 704, 706, 708 originated over successive points in time 710 to generate an output 712. An example of a bidirectional model is described by Xusong Chen, Dong Liu, Chenyi Lei, Rui Li, Zheng-Jun Zha, and Zhiwei Xiong. 2019. BERT4SessRec: Content-Based Video Relevance Prediction with Bidirectional Encoder Representations from Transformer. *In Proceedings of the 27th ACM International Conference on Multimedia.* 2597-2601, which is hereby incorporated by reference in its entirety. Therefore, instead of passing information forward set-by-step as performed in unidirectional model of FIG. 7, dependencies are captured at any distance within the sequence.

For the predictor layer 618, given an output of a last block of the transformed layers as:

$$E_t^{(b)} \in \mathbb{R}^{1 \times d}$$

at timestep "t", i.e., the "t-th" row in matrix:

$$E_t^{(b)} \in \mathbb{R}^{\hat{N} \times d}$$

a bidirectional technique is leveraged to calculate an output probability over a target "i" as:

$$P(\hat{s}_{t+1}=i|\hat{S},\delta(\hat{s}_{t+1})=1)=\text{softmax}_i(E_t^{(B)}M^T)$$

where item interaction sequence "S" and query sequence are inputs and organized as "Ŝ" and processed by the model. Item "I" is a target item in timestep "t+1" as follows:

$$i \in \hat{s}_{t+1}$$

"M" is the item bedding matrix, and so logits as interpreted as inner product similarity for the equation above between the output representation:

$$E_t^{(b)}$$

with original item embeddings from "M." Specifically, "softmax$_i$" denotes selection of the "i-th" probability from the softmax layer.

FIG. 10 depicts an example 1000 of training of the machine-learning model 122 using a training loss 220 as part of a self-attentive sequential recommendation architecture with heterogeneous sequences incorporating queries. Candidate sequence 902 of search queries and digital content are processed by a transformer layer 904 to generate candidate outputs 906 of predictions of digital content and search queries. The training loss 220 does not consider labels of deactivate ranked output illustrated in gray of search queries as the goal of the prediction in this example is interaction with digital content.

For example, because the machine-learning model 122 is configured for next-item prediction, but input sequences (and shifted output sequences) are heterogeneous, the prediction output:

$$P(\hat{s}_{t+1}=i|\hat{S},\delta(\hat{s}_{t+1})=1)$$

is considered for training where target:

$$\hat{s}_{t+1}$$

is an item interaction action instead of a query. Targeted timesteps are selected using:

$$\mathcal{I}(\hat{S})$$

Where "ŝ's" interaction type is an item interaction. Therefore, the training loss 220 is defined as:

$$\mathcal{L} = -\frac{1}{|\mathcal{I}(\hat{S})|} \sum_{j \in \mathcal{I}(\hat{S})} \log P(\hat{s}_j = i_j \mid \hat{S}, \delta(\hat{s}_{t+1}) = 1)$$

FIG. 10 depicts an example 1000 of use of the trained machine-learning model 122 to generate a search result. A search query module 1002 receives a search query 1004 from an entity to initiate a search of a plurality of digital content 110 (block 1102). The search query 1004 is configurable in a variety of ways to initiate a search of a variety of types of digital content. The search query 1004, for instance, is configurable as text to support a search of the digital content 110 as part of a keyword search, natural language processing and understanding, and so forth. In another instance, the search query 1004 includes other types of data, such as positional information, digital images, digital audio, and so forth. As previously described, the search query 1004 is receivable by the search query module 1002 via the network 106, locally by the device itself, and so forth.

The search query 1004 is passed from the search query module 1002 to a sequence data module 1006. The sequence data module 1006 is configured to obtain sequence input data 1008. The sequence input data 1008 describes a sequence of the digital content, with which, the entity has interacted (block 1104). The sequence data module 1006, for instance, monitors interaction of an entity with previous search results, such as selections of particular items from the search results. This is used to generate the sequence input data 1008 to describe particular items or actions that are previously undertaken by the entity and search queries used to generate the search results. In a stock digital image example, the sequence input data 208 describes stock digital images selected for use from search results and search queries used to generate the search results. The sequence input data 1008 also describes a temporal order, in which, the digital images are obtained and may specify respective times, e.g., through use of timestamps. Other examples of sequence input data 1008 are also contemplated that describe any sequence of actions and/or items (e.g., digital content) associated with the entity or another entity.

The search query 1004 and the sequence input data 1008 are then received as an input by the query-aware search system 120. The query-aware search system 120 is configured to generate a search result 210 based on this input data (block 1106). In one example, a query-aware embedding layer is used to embed the search query as a feature of a respective item of digital content using machine learning (block 1108) as described above in relation to FIG. 3.

The search result 1010, once generated, is used as a basis by a search result representation module 1012 to generate a representation 1014 of digital content 110 referenced by the search result 1010 (block 1110). The search result 1010 having the representation 1014 is then output by a search result output module 1016 (block 1112). In a stock digital image scenario, for instance, the representation 1014 is configured as a thumbnail depicting the stock digital image, includes a watermark, and is selectable to initiate a purchase or other technique to obtain the actual item of digital content 110. Other examples are also contemplated for other types of digital content, including cover art for digital music, a frame of a digital video, cover of a digital book, and so forth.

Example System and Device

Figure 12:
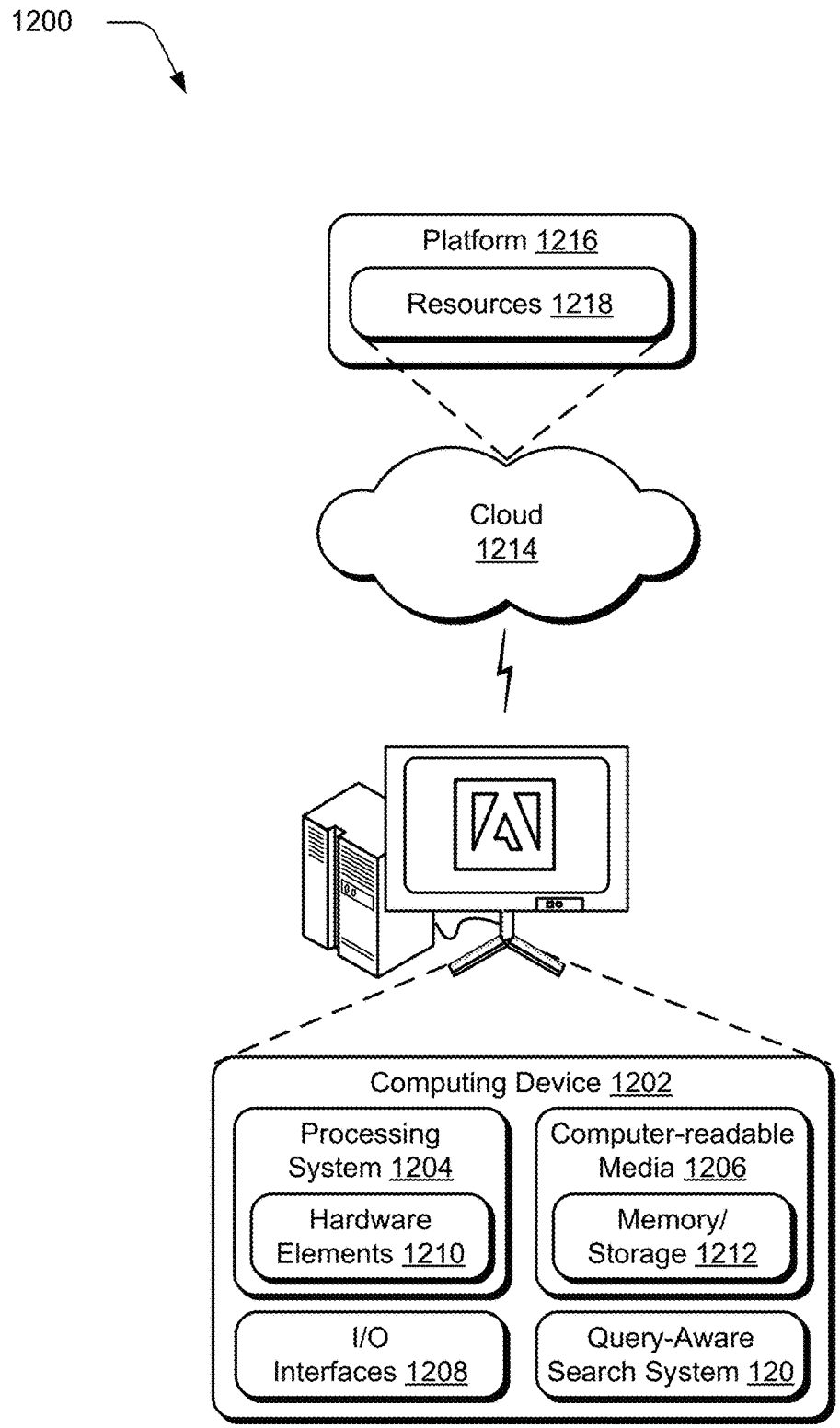
FIG. 12 illustrates an example system including various components of an example device that can be implemented as any type of computing device as described and/or utilize with reference to FIGS. 1-11 to implement embodiments of the techniques described herein.

FIG. 12 illustrates an example system generally at 1200 that includes an example computing device 1202 that is representative of one or more computing systems and/or devices that implement the various techniques described herein. This is illustrated through inclusion of the query-aware search system 120. The computing device 1202 is configurable, for example, as a server of a service provider, a device associated with a client (e.g., a client device), an on-chip system, and/or any other suitable computing device or computing system.

The example computing device 1202 as illustrated includes a processing system 1204, one or more computer-readable media 1206, and one or more I/O interface 1208 that are communicatively coupled, one to another. Although not shown, the computing device 1202 further includes a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1204 is representative of functionality to perform one or more operations using hardware. Accordingly, the processing system 1204 is illustrated as including hardware element 1210 that is configurable as processors, functional blocks, and so forth. This includes implementation in hardware as an application specific integrated circuit or other logic device formed using one or more semiconductors. The hardware elements 1210 are not limited by the materials from which they are formed or the processing mechanisms employed therein. For example, processors are configurable as semiconductor(s) and/or transistors (e.g., electronic integrated circuits (ICs)). In such a context, processor-executable instructions are electronically-executable instructions.

The computer-readable storage media 1206 is illustrated as including memory/storage 1212. The memory/storage 1212 represents memory/storage capacity associated with one or more computer-readable media. The memory/storage 1212 includes volatile media (such as random access memory (RAM)) and/or nonvolatile media (such as read only memory (ROM), Flash memory, optical disks, magnetic disks, and so forth). The memory/storage 1212 includes fixed media (e.g., RAM, ROM, a fixed hard drive, and so on) as well as removable media (e.g., Flash memory, a removable hard drive, an optical disc, and so forth). The computer-readable media 1206 is configurable in a variety of other ways as further described below.

Input/output interface(s) 1208 are representative of functionality to allow a user to enter commands and information to computing device 1202, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., employing visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1202 is configurable in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are configurable on a variety of commercial computing platforms having a variety of processors.

An implementation of the described modules and techniques is stored on or transmitted across some form of computer-readable media. The computer-readable media includes a variety of media that is accessed by the computing device 1202. By way of example, and not limitation, computer-readable media includes "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include but are not limited to RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and are accessible by a computer.

"Computer-readable signal media" refers to a signal-bearing medium that is configured to transmit instructions to the hardware of the computing device 1202, such as via a network. Signal media typically embodies computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1210 and computer-readable media 1206 are representative of modules, programmable device logic and/or fixed device logic implemented in a hardware form that are employed in some embodiments to implement at least some aspects of the techniques described herein, such as to perform one or more instructions. Hardware includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are also be employed to implement various techniques described herein. Accordingly, software, hardware, or executable modules are implemented as one or more instructions and/or logic embodied on some form of computer-readable storage media and/or by one or more hardware elements 1210. The computing device 1202 is configured to implement particular instructions and/or functions corresponding to the software and/or hardware modules. Accordingly, implementation of a module that is executable by the computing device 1202 as software is achieved at least partially in hardware, e.g., through use of computer-readable storage media and/or hardware elements 1210 of the processing system 1204. The instructions and/or functions are executable/operable by one or more articles of manufacture (for example, one or more computing devices 1202 and/or processing systems 1204) to implement techniques, modules, and examples described herein.

The techniques described herein are supported by various configurations of the computing device 1202 and are not limited to the specific examples of the techniques described herein. This functionality is also implementable all or in part through use of a distributed system, such as over a "cloud" 1214 via a platform 1216 as described below.

The cloud 1214 includes and/or is representative of a platform 1216 for resources 1218. The platform 1216 abstracts underlying functionality of hardware (e.g., servers) and software resources of the cloud 1214. The resources 1218 include applications and/or data that can be utilized while computer processing is executed on servers that are remote from the computing device 1202. Resources 1218 can also include services provided over the Internet and/or through a subscriber network, such as a cellular or Wi-Fi network.

The platform 1216 abstracts resources and functions to connect the computing device 1202 with other computing devices. The platform 1216 also serves to abstract scaling of resources to provide a corresponding level of scale to encountered demand for the resources 1218 that are implemented via the platform 1216. Accordingly, in an interconnected device embodiment, implementation of functionality described herein is distributable throughout the system 1200. For example, the functionality is implementable in part on the computing device 1202 as well as via the platform 1216 that abstracts the functionality of the cloud 1214.

Conclusion

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method implemented by a computing device, the method comprising:
    receiving, by the computing device, a search query;
    obtaining, by the computing device, sequence input data based on the search query, the sequence input data describing a sequence, the sequence including:
        previous search results associated with respective previous search queries, the sequence of the previous search results and the respective previous search queries being a heterogenous sequence configured as an ordered list, in which, items of the previous search results follow the respective previous search queries over time and the respective previous search queries are text-based;
        at least one digital image as part of the previous search results; and
        data describing user interactions with the previous search results;
    generating, by the computing device, embedding data based on the sequence input data using an embedding module of a machine-learning model, the embedding module including a query-aware embedding layer that generates embeddings of the sequence input data including the respective previous search queries, the previous search results and the data describing the user interactions;
    generating, by the computing device, a search result referencing at least one item of digital content by processing the embedding data using at least one layer of the machine-learning model; and
    outputting, by the computing device, the search result.

2. The method as described in claim 1, wherein the at least one layer is a transformer layer and the machine-learning model employs a self-attention mechanism.

3. The method as described in claim 1, wherein the query-aware embedding layer is configured to embed the respective previous search queries as features of the previous search results using machine learning.

4. The method as described in claim 1, further comprising training the machine-learning model using training sequence data describing a plurality of training sequences from training input data, the training including:
    constructing a graph having links between nodes representing training digital content in the training sequence data and nodes representing corresponding training search queries;
    constructing a training sequence having a first said node from the graph; and
    generating an augmented training sequence by replacing the first said node in the training sequence with a second said node.

5. The method as described in claim 4, wherein the replacing is based on identifying that the first said node and the second said node are both linked to a common said node in the graph.

6. The method as described in claim 4, wherein the replacing is based on identifying that the first said node and the second said node are both linked to at least a threshold number of common said nodes in the graph.

7. The method as described in claim 4, wherein the replacing is based on semantic similarity.

8. The method as described in claim 1, wherein the search query received by the computing device is from an entity using the computing device, the previous search results associated with the respective search queries are from the entity using the computing device, and the user interactions with the previous search results are by the entity using the computing device.

9. A system comprising:
    means for receiving a search query;
    means for obtaining sequence input data describing a sequence, the sequence including:
        previous search results associated with respective previous search queries, the sequence of the previous search results and the respective previous search queries being a heterogenous sequence configured as an ordered list, in which, items of the previous search results follow the respective previous search queries over time and the respective previous search queries are text-based;
        at least one of a digital movie, a digital book, a digital document, an application, or a setting as part of the previous search results; and
        data describing user interactions with the previous search results; and
    means for generating embedding data based on the sequence input data using an embedding module of a machine learning module, the embedding module including a query-aware embedding layer that generates embeddings of the sequence input data including the respective search queries, the previous search results and the data describing the user interactions; and means for generating a search result by processing the sequence input data and search query using the machine-learning model to process the embeddings of the sequence input data including the respective previous search queries, the previous search results and the data describing the user interactions, the machine-learning model trained using training data describing:

a sequence of training digital content selected from training search results; and training search queries used to initiate generation of respective said training search results.

10. The system as described in claim 9, wherein the respective previous search queries are embedded as features of the previous search results using machine learning.

11. The system as described in claim 10, wherein the machine-learning model includes a transformer layer configured to generate the search result based on the embedding data.

12. The system as described in claim 9, wherein the search query is from an entity, the previous search results associated with the respective search queries are from the entity, and the user interactions with the previous search results are by the entity.

13. A method implemented by a computing device, the method comprising:

receiving, by the computing device, a search query;

obtaining, by the computing device, sequence input data based on the search query, the sequence input data describing a sequence, the sequence including:

previous search results associated with respective previous search queries as a heterogenous sequence configured as an ordered list, in which, items of the previous search results follow the respective previous search queries over time, the respective previous search queries being text-based;

at least one of a digital movie, digital book, or digital document as part of the previous search results; and data describing user interactions with the previous search results;

generating, by the computing device, embedding data based on the sequence input data using an embedding module of a machine-learning model, the embedding module including a query-aware embedding layer that generates embeddings of the sequence input data including the respective previous search queries, the previous search results and the data describing the user interactions;

generating, by the computing device, a search result referencing at least one item of digital content by processing the embedding data using at least one layer of the machine-learning model; and outputting, by the computing device, the search result.

14. The method as described in claim 13, wherein the at least one layer is a transformer layer and the machine-learning model employs a self-attention mechanism.

15. The method as described in claim 13, wherein the query-aware embedding layer is configured to embed the respective search queries as features of the respective previous search results using machine learning.

16. The method as described in claim 13, further comprising training the machine-learning model using training sequence data describing a plurality of training sequences from training input data, the training including:

constructing a graph having links between nodes representing training digital content in the training sequence data and nodes representing corresponding training search queries;

constructing a training sequence having a first said node from the graph; and generating an augmented training sequence by replacing the first said node in the training sequence with a second said node.

17. The method as described in claim 16, wherein the replacing is based on identifying that the first said node and the second said node are both linked to a common said node in the graph.

18. The method as described in claim 16, wherein the replacing is based on identifying that the first said node and the second said node are both linked to at least at threshold number of common said nodes in the graph.

19. The method as described in claim 16, wherein the replacing is based on semantic similarity.

20. The method as described in claim 13, wherein the search query received by the computing device is from an entity using the computing device, the previous search results associated with the respective search queries are from the entity using the computing device, and the user interactions with the previous search results are by the entity using the computing device.

* * * * *